(12) United States Patent
Mondal

(10) Patent No.: US 10,931,190 B2
(45) Date of Patent: Feb. 23, 2021

(54) SYSTEMS AND METHODS FOR MITIGATING HARMONICS IN ELECTRICAL SYSTEMS BY USING ACTIVE AND PASSIVE FILTERING TECHNIQUES

(71) Applicant: Inertech IP LLC, Danbury, CT (US)

(72) Inventor: Subrata K. Mondal, South Windsor, CT (US)

(73) Assignee: INERTECH IP LLC, Plano, TX (US)

( * ) Notice: Subject to any disclaimer, the term of this patent is extended or adjusted under 35 U.S.C. 154(b) by 416 days.

(21) Appl. No.: 15/333,177

(22) Filed: Oct. 24, 2016

(65) Prior Publication Data

US 2017/0117748 A1    Apr. 27, 2017

Related U.S. Application Data

(60) Provisional application No. 62/244,862, filed on Oct. 22, 2015.

(51) Int. Cl.
*H02J 9/06* (2006.01)
*H02M 1/12* (2006.01)
(Continued)

(52) U.S. Cl.
CPC ............. *H02M 1/12* (2013.01); *H02J 3/01* (2013.01); *H02J 3/1857* (2013.01); *H02J 3/32* (2013.01);
(Continued)

(58) Field of Classification Search
CPC ........ H02M 1/12; H02M 7/487; H02M 3/158; H02J 3/32; H02J 3/1857; H02J 3/01; H02J 3/28; Y02E 40/40; Y02E 40/26
See application file for complete search history.

(56) References Cited

U.S. PATENT DOCUMENTS

| 5,200,644 A | 4/1993 | Kobayashi et al. |
| 5,343,079 A | 8/1994 | Mohan et al. |

(Continued)

FOREIGN PATENT DOCUMENTS

| AU | 2010256688 A1 | 1/2012 |
| CN | 101442893 A | 5/2009 |

(Continued)

OTHER PUBLICATIONS

Samet Biricik et al., "Real-Time Control of Shunt Active Power Filter under Distorted Grid Voltage and Unbalanced Load Condition Using Self Tuning Filter", Apr. 2014, Dublin Institute of Technology, p. 4 (Year: 2014).*

(Continued)

*Primary Examiner* — Rexford N Barnie
*Assistant Examiner* — Thai H Tran
(74) *Attorney, Agent, or Firm* — Weber Rosselli & Cannon LLP

(57) ABSTRACT

Systems and methods of the present disclosure involve passive, hybrid, and active filtering configurations to mitigate current harmonics for various electrical loads. One hybrid filtering configuration is medium voltage (MV) active filtering using a DC-DC converter and a multi-level inverter, and low voltage (LV) passive filtering. Another hybrid filtering configuration is MV passive filtering and LV active filtering using a two-level inverter. An active filtering configuration includes both MV and LV active filtering. The present disclosure also features power distribution unit (PDU) transformers electrically coupled to respective power supplies on the LV side of an electrical system. Each PDU transformer includes primary coils in a delta configuration and secondary coils in a wye configuration. The secondary coils are in series with respective leakage inductance coils.

(Continued)

The secondary coils and the leakage inductance coils are integrated together into a single unit or module.

20 Claims, 16 Drawing Sheets

(51) Int. Cl.
  *H02M 3/158* (2006.01)
  *H02M 7/537* (2006.01)
  *H02J 3/18* (2006.01)
  *H02J 3/32* (2006.01)
  *H02M 7/487* (2007.01)
  *H02J 3/01* (2006.01)
  *H02J 3/28* (2006.01)

(52) U.S. Cl.
  CPC ........... *H02M 3/158* (2013.01); *H02M 7/487* (2013.01); *H02J 3/28* (2013.01); *Y02E 40/20* (2013.01); *Y02E 40/40* (2013.01)

(56) References Cited

U.S. PATENT DOCUMENTS

| | | | |
|---|---|---|---|
| 5,343,080 A * | 8/1994 | Kammeter | H01F 27/385 |
| | | | 307/105 |
| 5,612,580 A | 3/1997 | Janonis et al. | |
| 5,694,312 A | 12/1997 | Brand et al. | |
| 5,715,693 A | 2/1998 | van der Walt et al. | |
| 5,818,379 A | 10/1998 | Kim | |
| 6,116,048 A | 9/2000 | Hebert | |
| 6,160,722 A | 12/2000 | Thommes et al. | |
| 6,201,720 B1 | 3/2001 | Tracy et al. | |
| 6,374,627 B1 | 4/2002 | Schumacher et al. | |
| 6,404,655 B1 | 6/2002 | Welches | |
| 6,574,104 B2 | 6/2003 | Patel | |
| 6,617,708 B2 | 9/2003 | Boost | |
| 6,640,561 B2 | 11/2003 | Roberto | |
| 6,772,604 B2 | 8/2004 | Bash et al. | |
| 6,826,922 B2 | 12/2004 | Patel et al. | |
| 6,859,366 B2 | 2/2005 | Fink | |
| 6,879,053 B1 | 4/2005 | Welches et al. | |
| 6,924,993 B2 | 8/2005 | Stancu et al. | |
| 6,950,321 B2 | 9/2005 | Stancu et al. | |
| 6,980,433 B2 | 12/2005 | Fink | |
| 7,046,514 B2 | 5/2006 | Fink et al. | |
| 7,106,590 B2 | 9/2006 | Chu et al. | |
| 7,173,820 B2 | 2/2007 | Fink et al. | |
| 7,352,083 B2 | 4/2008 | Nielsen et al. | |
| 7,406,839 B2 | 8/2008 | Bean et al. | |
| 7,418,825 B1 | 9/2008 | Bean, Jr. | |
| 7,477,514 B2 | 1/2009 | Campbell et al. | |
| 7,495,415 B2 | 2/2009 | Kanouda et al. | |
| 7,560,831 B2 | 7/2009 | Whitted et al. | |
| 7,561,411 B2 | 7/2009 | Johnson, Jr. | |
| 7,569,954 B2 | 8/2009 | Tolle et al. | |
| 7,660,116 B2 | 2/2010 | Claassen et al. | |
| 7,660,121 B2 | 2/2010 | Campbell et al. | |
| 7,684,193 B2 | 3/2010 | Fink et al. | |
| 7,730,731 B1 | 6/2010 | Bash et al. | |
| 7,738,251 B2 | 6/2010 | Clidaras et al. | |
| 7,804,687 B2 | 9/2010 | Copeland et al. | |
| 7,855,890 B2 | 12/2010 | Kashirajima et al. | |
| 7,864,527 B1 | 1/2011 | Whitted | |
| 7,881,057 B2 | 2/2011 | Fink et al. | |
| 7,903,404 B2 | 3/2011 | Tozer et al. | |
| 7,903,409 B2 | 3/2011 | Patel et al. | |
| 7,907,406 B1 | 3/2011 | Campbell et al. | |
| 7,957,144 B2 | 6/2011 | Goettert et al. | |
| 7,963,119 B2 | 6/2011 | Campbell et al. | |
| 8,000,103 B2 | 8/2011 | Lipp et al. | |
| 8,031,468 B2 | 10/2011 | Bean, Jr. et al. | |
| 8,080,900 B2 | 12/2011 | Corhodzic et al. | |
| 8,093,746 B2 | 1/2012 | Murali Dora et al. | |
| 8,118,084 B2 | 2/2012 | Harvey | |
| 8,120,916 B2 | 2/2012 | Schmidt et al. | |
| 8,146,374 B1 | 4/2012 | Zien | |
| 8,184,435 B2 | 5/2012 | Bean, Jr. et al. | |
| 8,189,334 B2 | 5/2012 | Campbell et al. | |
| 8,199,504 B2 | 6/2012 | Kashirajima et al. | |
| 8,208,258 B2 | 6/2012 | Campbell et al. | |
| 8,218,322 B2 | 7/2012 | Clidaras et al. | |
| 8,261,565 B2 | 9/2012 | Borror et al. | |
| 8,289,710 B2 | 10/2012 | Spearing et al. | |
| 8,297,069 B2 | 10/2012 | Novotny et al. | |
| 8,320,125 B1 | 11/2012 | Hamburgen et al. | |
| 8,351,200 B2 | 1/2013 | Arimilli et al. | |
| 8,384,244 B2 | 2/2013 | Peterson et al. | |
| 8,387,687 B2 | 3/2013 | Baer | |
| 8,392,035 B2 | 3/2013 | Patel et al. | |
| 8,405,977 B2 | 3/2013 | Lin | |
| 8,432,690 B2 | 4/2013 | Fink et al. | |
| 8,456,840 B1 | 6/2013 | Clidaras et al. | |
| 8,457,938 B2 | 6/2013 | Archibald et al. | |
| 8,472,182 B2 | 6/2013 | Campbell et al. | |
| 8,514,575 B2 | 8/2013 | Goth et al. | |
| 8,583,290 B2 | 11/2013 | Campbell et al. | |
| 8,624,433 B2 | 1/2014 | Whitted et al. | |
| 8,689,861 B2 | 4/2014 | Campbell et al. | |
| 8,760,863 B2 | 6/2014 | Campbell et al. | |
| 8,763,414 B2 | 7/2014 | Carlson et al. | |
| 8,780,555 B2 | 7/2014 | Fink et al. | |
| 8,783,052 B2 | 7/2014 | Campbell et al. | |
| 8,797,740 B2 | 8/2014 | Campbell et al. | |
| 8,813,515 B2 | 8/2014 | Campbell et al. | |
| 8,816,533 B2 | 8/2014 | Navarro et al. | |
| 8,817,465 B2 | 8/2014 | Campbell et al. | |
| 8,817,474 B2 | 8/2014 | Campbell et al. | |
| 8,824,143 B2 | 9/2014 | Campbell et al. | |
| 8,836,175 B1 * | 9/2014 | Eichelberg | G06F 1/30 |
| | | | 307/147 |
| 8,839,638 B2 | 9/2014 | Kashirajima et al. | |
| 8,866,447 B2 | 10/2014 | Wang | |
| 8,867,204 B1 | 10/2014 | Gardner | |
| 8,879,257 B2 | 11/2014 | Campbell et al. | |
| 8,996,323 B1 * | 3/2015 | Morales | G01R 31/086 |
| | | | 324/527 |
| 9,182,795 B1 * | 11/2015 | Hill | G06F 1/189 |
| 9,766,670 B1 * | 9/2017 | Czamara | G06F 1/26 |
| 2002/0172007 A1 | 11/2002 | Pautsch | |
| 2003/0052543 A1 | 3/2003 | Boost | |
| 2003/0061824 A1 | 4/2003 | Marsala | |
| 2003/0076696 A1 | 4/2003 | Tsai | |
| 2003/0185021 A1 * | 10/2003 | Huang | H02M 3/33592 |
| | | | 363/17 |
| 2003/0222618 A1 | 12/2003 | Kanouda et al. | |
| 2003/0231009 A1 | 12/2003 | Nemoto et al. | |
| 2004/0084965 A1 | 5/2004 | Welches et al. | |
| 2004/0184232 A1 | 9/2004 | Fink | |
| 2005/0036248 A1 | 2/2005 | Klikic et al. | |
| 2005/0146223 A1 | 7/2005 | Kanouda et al. | |
| 2005/0162137 A1 | 7/2005 | Tracy et al. | |
| 2005/0231039 A1 | 10/2005 | Hunt | |
| 2006/0186739 A1 | 8/2006 | Grolnic et al. | |
| 2006/0221523 A1 | 10/2006 | Colombi et al. | |
| 2006/0245216 A1 | 11/2006 | Wu et al. | |
| 2007/0064363 A1 | 3/2007 | Nielsen et al. | |
| 2007/0109823 A1 * | 5/2007 | Rastogi | H02J 3/1857 |
| | | | 363/40 |
| 2007/0182383 A1 | 8/2007 | Park et al. | |
| 2007/0210652 A1 | 9/2007 | Tracy et al. | |
| 2007/0217125 A1 | 9/2007 | Johnson | |
| 2007/0227710 A1 | 10/2007 | Belady et al. | |
| 2007/0278860 A1 | 12/2007 | Krieger et al. | |
| 2008/0130332 A1 | 6/2008 | Taimela et al. | |
| 2008/0239775 A1 | 10/2008 | Oughton et al. | |
| 2008/0304300 A1 | 12/2008 | Raju et al. | |
| 2009/0021082 A1 | 1/2009 | Loucks et al. | |
| 2009/0051344 A1 | 2/2009 | Lumsden | |
| 2009/0086428 A1 | 4/2009 | Campbell et al. | |
| 2009/0154096 A1 | 6/2009 | Iyengar et al. | |
| 2009/0212631 A1 | 8/2009 | Taylor et al. | |
| 2009/0243398 A1 * | 10/2009 | Yohanan | H02J 3/1842 |
| | | | 307/105 |

(56) References Cited

U.S. PATENT DOCUMENTS

| | | |
|---|---|---|
| 2009/0302616 A1 | 12/2009 | Peterson |
| 2009/0315404 A1 | 12/2009 | Cramer et al. |
| 2010/0032142 A1 | 2/2010 | Copeland et al. |
| 2010/0094472 A1 | 4/2010 | Woytowitz et al. |
| 2010/0136895 A1 | 6/2010 | Sgro |
| 2010/0201194 A1 | 8/2010 | Masciarelli et al. |
| 2010/0264882 A1 | 10/2010 | Hartular et al. |
| 2010/0300650 A1 | 12/2010 | Bean, Jr. |
| 2011/0110136 A1* | 5/2011 | Lacarnoy ............ H02M 7/483 363/127 |
| 2011/0148197 A1 | 6/2011 | Hernandez et al. |
| 2011/0198057 A1 | 8/2011 | Lange et al. |
| 2011/0265983 A1 | 11/2011 | Pedersen |
| 2011/0278934 A1 | 11/2011 | Ghosh et al. |
| 2011/0304211 A1 | 12/2011 | Peterson et al. |
| 2011/0313576 A1 | 12/2011 | Nicewonger |
| 2012/0098342 A1 | 4/2012 | Johnson, Jr. |
| 2012/0103591 A1 | 5/2012 | Tozer |
| 2012/0174612 A1 | 7/2012 | Madara et al. |
| 2012/0194146 A1* | 8/2012 | Longacre ............ G06F 1/266 323/234 |
| 2014/0009988 A1 | 1/2014 | Valiani et al. |
| 2014/0122906 A1 | 5/2014 | Whitted et al. |
| 2015/0155712 A1 | 6/2015 | Mondal |
| 2016/0233776 A1* | 8/2016 | Nielsen ............ H02M 3/33592 |

FOREIGN PATENT DOCUMENTS

| | | |
|---|---|---|
| CN | 100584168 C | 1/2010 |
| CN | 101686629 A | 3/2010 |
| CN | 102334396 A | 1/2012 |
| CN | 102461357 A | 5/2012 |
| DE | 102012218873 A1 | 5/2013 |
| EP | 1604263 A2 | 12/2005 |
| EP | 2722978 A2 | 4/2014 |
| JP | 2008287733 A | 11/2008 |
| JP | 2010074941 A | 4/2010 |
| JP | 5113203 B2 | 1/2013 |
| JP | 5209584 B2 | 6/2013 |
| JP | 5243929 B2 | 7/2013 |
| JP | 5244058 B2 | 7/2013 |
| JP | 5301009 B2 | 9/2013 |
| JP | 5308750 B2 | 10/2013 |

OTHER PUBLICATIONS

International Preliminary Report issued in corresponding PCT Application No. PCT/US2013/050575 dated Jan. 13, 2015.
HP Modular Cooling System Site Preparation Guide, 2006-2007, <http://h20565.www2.hp.com/hpsc/doc/public/display?docId=emr_na-c00613691>.
Air-Cooled High-Performance Data Centers: Case Studies and Best Methods, 2006, <http://www.intel.in/content/dam/www/public/us/en/documents/white-papers/date-center-efficiency-air-cooled-bkms-paper.pdf>.
Liebert Xtreme Density—System Design Manual, 2009, <http://shared.liebert.com/SharedDocuments/LiebertFiles/SL_16655_REV09_07-09.pdf>.
Data Center Evolution a Tutorial on State of the Art, Issues, and Challenges, 2009, <http://www.cse.iitb.ac.in/~puru/courses/autumn12/cs695/downloads/dcevolve.pdf>.
Weatherman: Automated, Online, and Predictive Thermal Mapping and Management for Data Centers, 2006, <http://www.cse.iitb.ac.in/~puru/courses/spring14/cs695/downloads/weatherman.pdf>.
Reduced-Order Modeling of Multiscale Turbulent Convection: Application to Data Center Thermal Management, May 2006, <https://smartech.gatech.edu/bitstream/handle/1853/14605/rambo_jeffrey_200605_phd.pdf>.
PCT International Search Report and Written Opinion for PCT/US2015/056785 dated Feb. 2, 2016.
"Data Center Efficiency Assessment" by National Resources Defense Council—NRDC; Aug. 2014.
S K Mondal, B K Bose, V Oleschuk and J O P Pinto, "Space Vector Pulse Width Modulation of Three-Level Inverter Extending Operation Into Overmodulation Region," IEEE Trans. on Power Elect. vol. 18, pp. 604-611, Mar. 2003.
S K Mondal, J O P Pinto, and B K Bose, "A Neural-Network-Based Space-Vector PWM controller for a Three-Level Voltage-fed Inverter Induction Motor Drive," IEEE Trans. Ind. Application, vol. 38, pp. 660-669, May/Jun. 2002.

\* cited by examiner

SYSTEMS AND METHODS FOR MITIGATING HARMONICS IN ELECTRICAL SYSTEMS BY USING ACTIVE AND PASSIVE FILTERING TECHNIQUES

BACKGROUND

1. Technical Field

The present disclosure generally relates to harmonic mitigation techniques. More particularly, the present disclosure relates to active and passive hybrid filtering techniques to mitigate line harmonics.

2. Background of Related Art

Current and voltage harmonics, which are current and voltage signals having frequencies that are an integer multiple of the fundamental frequency, contribute to losses and reduces system efficiency. In the case of data centers (DCs), a small amount of permissible harmonic current increases the life of data center equipment, reduces malfunction of DSP controllers, reduces safety hazards, and reduces or eliminates potential penalties imposed by the utility because of large amounts of harmonic current, which may affect other loads connected at the point of common coupling (PCC). DCs are one of the largest and fastest growing consumers of electricity in the world. In 2013, DCs residing in the United States consumed an estimated 91 billion kWhr of electricity—enough electricity to power all the households in New York City twice over—and are on track to consume an estimated 140 billion kWhr by 2020.

The digital storage market doubles every 18 months due to explosion in use of digital data, which translates to an annual growth rate of approximately 150% for the next 5 years. Computer equipment manufacturers continue to expand their data collection and storage capabilities of their servers, which are widely used in DCs across the world. This expansion has led to an increase in the total power requirements of DCs both while connected to an electrical utility and during an interruption in power from the electrical utility. DCs now demand power in the megawatt range and voltage in the medium voltage (kV) range.

DCs generate harmonics due to the use of non-linear AC-DC-DC switching power supplies to power servers and variable frequency drives (VFDs) to control pump motors of cooling equipment. Operation of nearby loads at points of common coupling (PCC) of the grid will be disturbed in case the DC draws a large amount of harmonic currents from the grid. Therefore, all the loads connected to the electrical utility need to observe the IEEE 519 and 1547 standards that specify the allowable harmonic current drawn by loads connected to the grid.

SUMMARY

In an aspect, the present disclosure features an electrical system. The electrical system includes power distribution unit (PDU) transformers electrically coupled to respective power supplies. Each PDU transformer includes secondary coils in a wye configuration. The secondary coils are in series with respective leakage inductance coils. The secondary coils and the leakage inductance coils are integrated together into a single unit or module. The electrical system also includes a line reactor electrically coupled between an electrical grid and the PDU transformers. The electrical system also includes a medium voltage uninterruptible power supply (UPS) electrically coupled to the PDU transformers.

In aspects, the PDU transformers are electrically coupled to respective server power supplies and fan variable frequency drives, the line reactor is further electrically coupled between the electrical grid and cooling system equipment, and the medium voltage UPS is further electrically coupled to the cooling system equipment.

In aspects, the cooling system equipment includes fans for drawing hot air through evaporator coils, a cooling distribution unit (CDU) having a pump, a cooling system pump, a fluid cooler having fans, and a chiller having a compressor.

In aspects, each PDU transformer includes primary coils in a delta configuration. In aspects, each leakage inductance coil is formed by appropriate numbers of respective windings.

In another aspect, the present disclosure features an electrical system including power distribution unit (PDU) transformers electrically coupled to respective power supplies. Each PDU transformer includes secondary coils in a wye configuration. The secondary coils are in series with respective leakage inductance coils. The secondary coils and the leakage inductance coils are integrated together into a single unit. The electrical system also includes a multi-level inverter electrically coupled to the PDU transformers and a DC-DC converter electrically coupled in series with the multi-level inverter. The electrical system also includes a controller coupled to the DC-DC converter and the multi-level inverter. The controller operates the DC-DC converter and the multi-level inverter in an active filtering mode to supply a harmonic current to compensate for a harmonic portion of a load current and in an MVUPS mode to supply power if an interruption in power is detected.

In aspects, the electrical system further includes a current sensor that senses a load current and the controller filters the sensed load current to obtain a harmonic portion of the sensed load current and controls the DC-DC converter and the multi-level inverter to generate the harmonic current based on the harmonic portion of the sensed load current.

In aspects, the PDU transformers are electrically coupled to respective server power supplies and fan variable frequency drives.

In aspects, the electrical system further includes an LCL filter coupled to an output of the multi-level inverter.

In aspects, each PDU transformer includes primary coils in a delta configuration. In aspects, the leakage inductance coils are formed by respective windings.

In still another aspect, the present disclosure features an electrical system including line reactors electrically coupled to respective power supplies. The electrical system also includes PDU transformers electrically coupled to the respective line reactors. Each PDU transformer includes secondary coils in a wye configuration. The electrical system also includes a multi-level inverter electrically coupled to the PDU transformers, a DC-DC converter electrically coupled in series with the multi-level inverter, and an energy storage device electrically coupled in parallel with the DC-DC converter. The electrical system also includes a controller coupled to the DC-DC converter and the multi-level inverter. The controller operates the DC-DC converter and the multi-level inverter in an active filtering mode to supply an opposite harmonic current to compensate for a harmonic portion of a load current and in a medium voltage uninterruptible supply (MVUPS) mode to supply power if an interruption in power is detected.

In aspects, the electrical system further includes a current sensor coupled to a main line of the electrical system and, in the active filtering mode, the controller controls the DC-DC converter to convert a first DC voltage supplied by the energy storage device into a second DC voltage, controls the multi-level inverter to generate an AC voltage from the second DC voltage, receives a measured load current from a current sensor, filters the measured load current using a high pass filter to obtain a harmonic portion of the measured load current, and controls the DC-DC converter and the multi-level inverter to generate an opposite harmonic current based on the harmonic portion of the measured load current and supply the opposite harmonic current to an electrical grid.

In aspects, the controller further determines whether an interruption in power to the electrical system has occurred, and, if the controller determines that an interruption in power to the electrical system has occurred, operate the DC-DC converter and the multi-level inverter in an MVUPS mode to supply a current to the load from the energy storage device.

In aspects, the PDU transformers are electrically coupled to respective server power supplies and fan variable frequency drives.

In still another aspect, the present disclosure features an electrical system including active filters electrically coupled in parallel with respective power supplies and first current sensors that sense first load currents between the respective active filters and the respective power supplies. The electrical system also includes at least a first controller that filters the sensed first load currents to obtain harmonic portions of the sensed first load currents and that controls the active filters to generate respective first harmonic currents based on the respective harmonic portions of the sensed load currents. The electrical system also includes PDU transformers electrically coupled in parallel with the respective active filters. Each PDU transformer includes secondary coils in a wye configuration. The electrical system also includes a multi-level inverter electrically coupled to the PDU transformers and a DC-DC converter electrically coupled with the multi-level inverter.

The electrical system also includes a DC-DC converter electrically coupled in series with the multi-level inverter. The electrical system also includes a second current sensor that senses a second load current at a point of common coupling and a second controller coupled to the DC-DC converter and the multi-level inverter. The second controller filters the sensed second load current to obtain a harmonic portion of the sensed second load current and controls the DC-DC converter and the multi-level inverter to generate a second harmonic current based on the harmonic portion of the sensed second load current and supply the second harmonic current to the electrical grid. The second controller further operates the DC-DC converter and the multi-level inverter in an MVUPS mode to supply power from an energy storage device if an interruption in power is detected.

In aspects, each active filter of the active filters includes an energy storage device, a two-level inverter, and an LCL filter electrically coupled together. In aspects, each active filter of the active filters is controlled using the space vector pulse width modulation (SVPWM) technique.

In still another aspect, the present disclosure features a method for mitigating harmonics in an electrical system. The method includes supplying a first DC voltage from a low voltage energy storage device, converting the first DC voltage into a second DC voltage, generating an AC voltage from the second DC voltage, measuring a load current, filtering the measured load current using a high pass filter to obtain a harmonic portion of the measured load current, generating an opposite harmonic current based on the harmonic portion of the measured load current; and supplying the opposite harmonic current to an electrical grid.

BRIEF DESCRIPTION OF THE DRAWINGS

Various embodiments of the present disclosure are described with reference to the accompanying drawings wherein.

DETAILED DESCRIPTION

Figure 1:
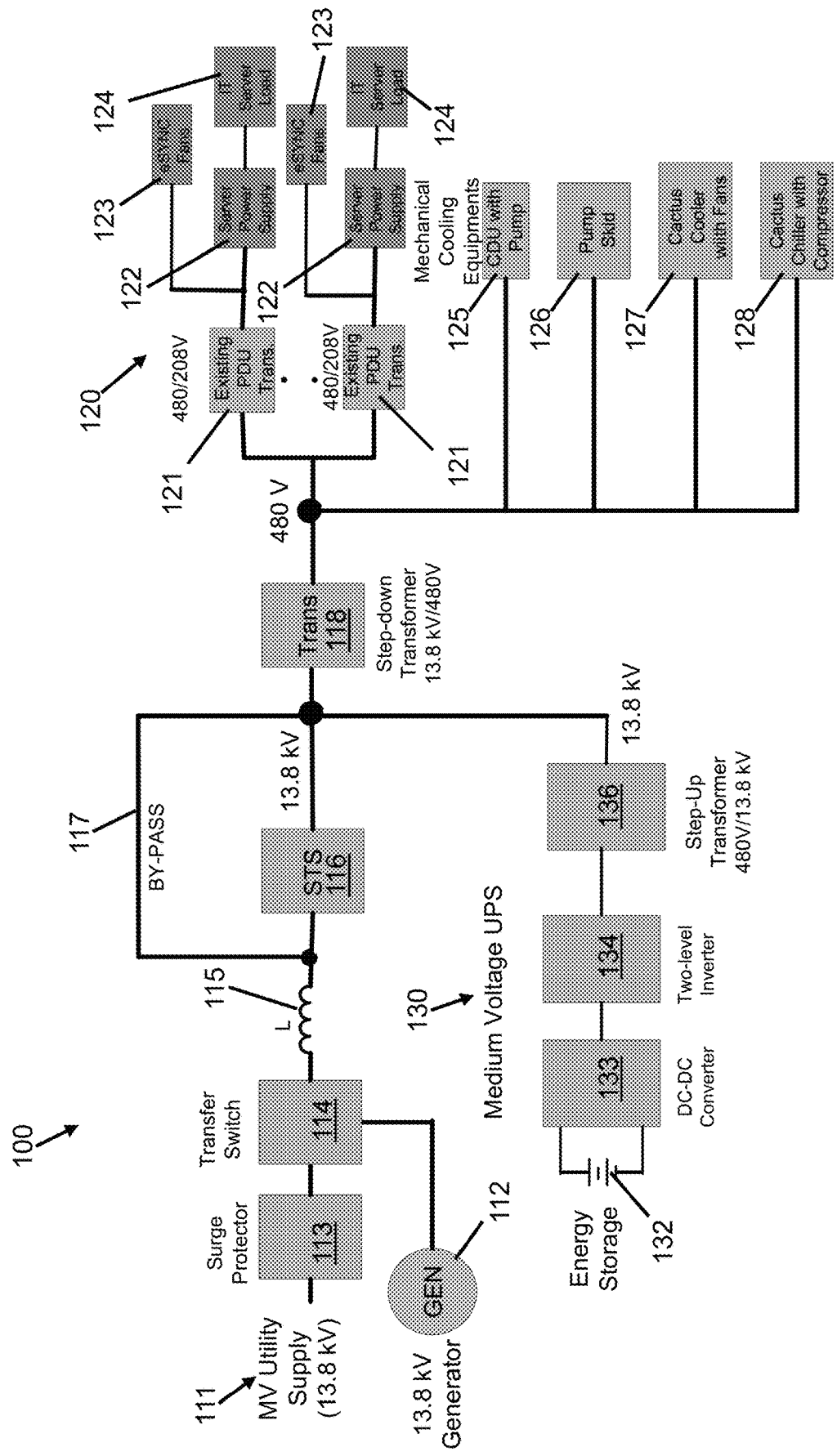
FIG. 1 is a schematic block diagram of an existing medium voltage (MV) data center (DC) electrical system for supplying power to server and mechanical cooling loads and incorporating a line reactor located at the MV distribution.

FIG. 1 shows an existing MV DC electrical system for supplying power to server and mechanical cooling loads. The system includes a utility/generator power supply system and a MVUPS 130, a shunt connected Voltage Source Inverter (VSI) with battery energy storage 132 that includes a step-up transformer 136 for MV applications. The system also incorporates a line reactor L 115 located at the MV distribution point to mitigate line current harmonics at the grid. The line reactor L is coupled to an AC MV line to reduce harmonics in the power supplied by the MV utility supply 111 or generator supply 112. Line reactor L 115 is in the passive filtering mode. A step-down transformer 118 is disposed in series with the IT load 120 and the mechanical cooling loads, i.e., a cooling distribution unit (CDU) having a pump 125, a pump skid having multiple pumps 126, a fluid cooler having fans 127, and a chiller having a compressor 128. The IT server load 120 is connected to an AC-DC-DC switching power supply 122, which, in turn is connected to the PDU transformer 121. An evaporator cooling fan systems 123 are also connected to the PDU transformers 121. The CDU 125, the pump skid 126, the fluid cooler 127, and the chiller 128 are connected to the step-down transformer and are used for mechanical cooling of the IT server load 120, i.e., to remove waste heat generated by the IT server load 120.

Under normal load conditions, the entire power supplied to the DC is supplied to the load by the utility supply 111. The utility supply 111 supplies an AC voltage (ranging from about 3.3 kV to 13.8 kV) for MV application. A bypass line 117 allows for maintenance tasks or other work to be performed on the electrical system when an ON/OFF switch (not shown) of the bypass line is closed and a static transfer switch (STS) 116 is opened. The STS 116 supplies power to an IT load when it is in the ON position. The step-down transformer 118 converts the medium voltage supplied by the utility supply 111, e.g., 13.8 kV, to a low voltage, e.g., 480 V. The PDU transformers 121 are used to generate low voltage (e.g., either 208 V or 230 V) for the IT server load 120.

When an interruption or disturbance in the power supplied by the utility supply 111 is detected, the STS 116 opens and the MVUPS 130 starts supplying about 100% of the power to the load within, for example, 2 to 4 ms via the MVUPS's step-up transformer 136. The MVUPS 130 can supply power to the load for a short period, e.g., approximately two to five minutes depending on Amp-hour storage capacity of the energy storage device 132, but generally the generator starts producing power if the interruption is more than a few seconds.

The MVUPS 130 generates power from a low-voltage energy storage device, e.g., one or more lead-acid or lithium-ion batteries arranged in parallel. The low voltage of the energy storage device 132 may range, for example, from about 700 V to about 1000 V. The voltage of the energy storage device 132 is then converted to a low AC voltage, e.g., 480 V, using a two-level IGBT inverter 134. The AC voltage output from the two-level inverter 134 passes through a filter (not shown), such as an inductor-capacitor (LC) filter, to the step-up transformer 136. The step-up transformer 136, converts the low AC voltage (e.g., 480 V) to a medium AC voltage, e.g., 13.8 kV. The medium AC voltage output from the step-up transformer 136 is then provided to the step-down transformer 118, which converts the medium AC voltage, e.g., 13.8 kV, to a low AC voltage, e.g., 480 V, appropriate for the DC loads.

Once the generator 112 has reached its reference speed and is stabilized, the transfer switch 114 shifts the primary power source from the utility supply 111 to the generator 112. During this shift, the output voltage of the MVUPS 130 is synchronized to be in phase with the output voltage of the generator 112. Once the STS 116 is closed, a soft transfer from the MVUPS 130 to the generator 112 is executed until the load is entirely powered by the generator 112. The energy storage device 132 of the MVUPS 130 is then recharged by the power generated by the generator 112.

After the power interruption or disturbance ends, the load is shifted from the generator 112 to the MVUPS 130 because the utility supply 111 may be out of phase with the generator 112 and the STS 116 shifts the primary power source to the utility supply 111. The output voltage of the MVUPS 111 is then synchronized to be in phase with the output voltage of the utility supply 111. Once the output voltage of the MVUPS and the utility supply 111 are synchronized, the load is quickly transferred from the MVUPS 130 to the utility supply 111. Then, the energy storage devices 132 of the MVUPS 111 are recharged from the utility supply 111 so that the MVUPS is ready for future interruptions or disturbances in the utility supply 111.

The IT server load 124 is normally powered by the utility supply 111 as shown in FIG. 1. The IT server load 124 draws current harmonics from the utility supply 111 due to the presence of a non-linear power supply to power the IT server load 124. Passive, active, and hybrid filtering techniques are used to reduce current harmonics to adhere to the IEEE-519 and 1547 allowable harmonics standard that may be required by the grid.

Figure 2:
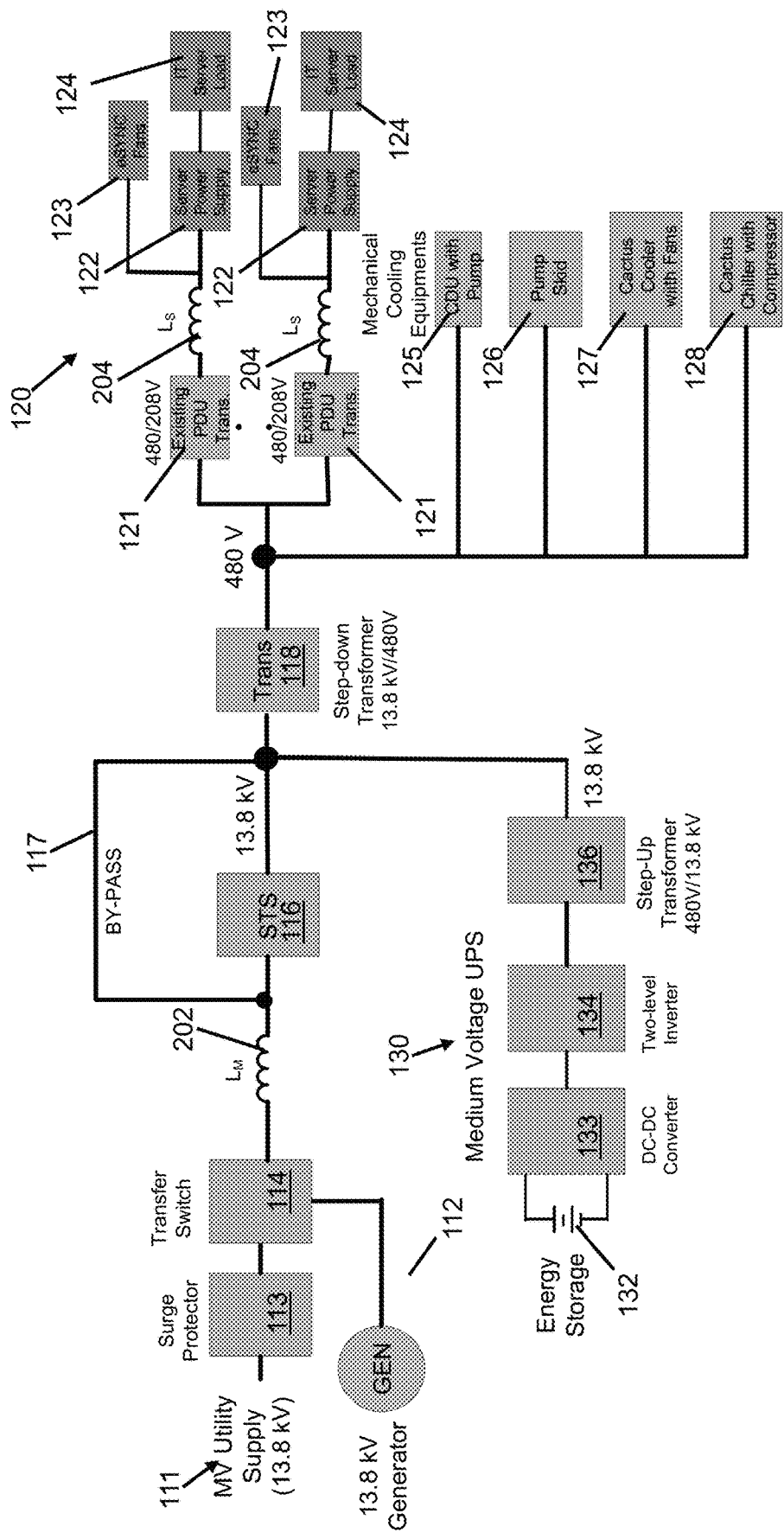
FIG. 2 is a schematic block diagram of an existing MV DC electrical system incorporating an additional line reactor located at the LV distribution to mitigate harmonic current.

FIG. 2 shows a MV DC electrical system incorporating a line reactor $L_M$ 202 located at the MV distribution to mitigate harmonic current. Line reactor $L_M$ 202 is coupled to AC MV line to reduce harmonics in the power supplied by the utility supply 111 or generator supply 112. The MV DC electrical system also incorporates additional modular line reactors $L_S$ located at the LV distribution point at the output of individual existing PDU transformers 121. The combination of line reactors $L_M$ and $L_S$ reduces a large amount of harmonic current in comparison to FIG. 1. Both line reactors $L_M$ and $L_S$ are in the passive filtering mode.

Figure 3:
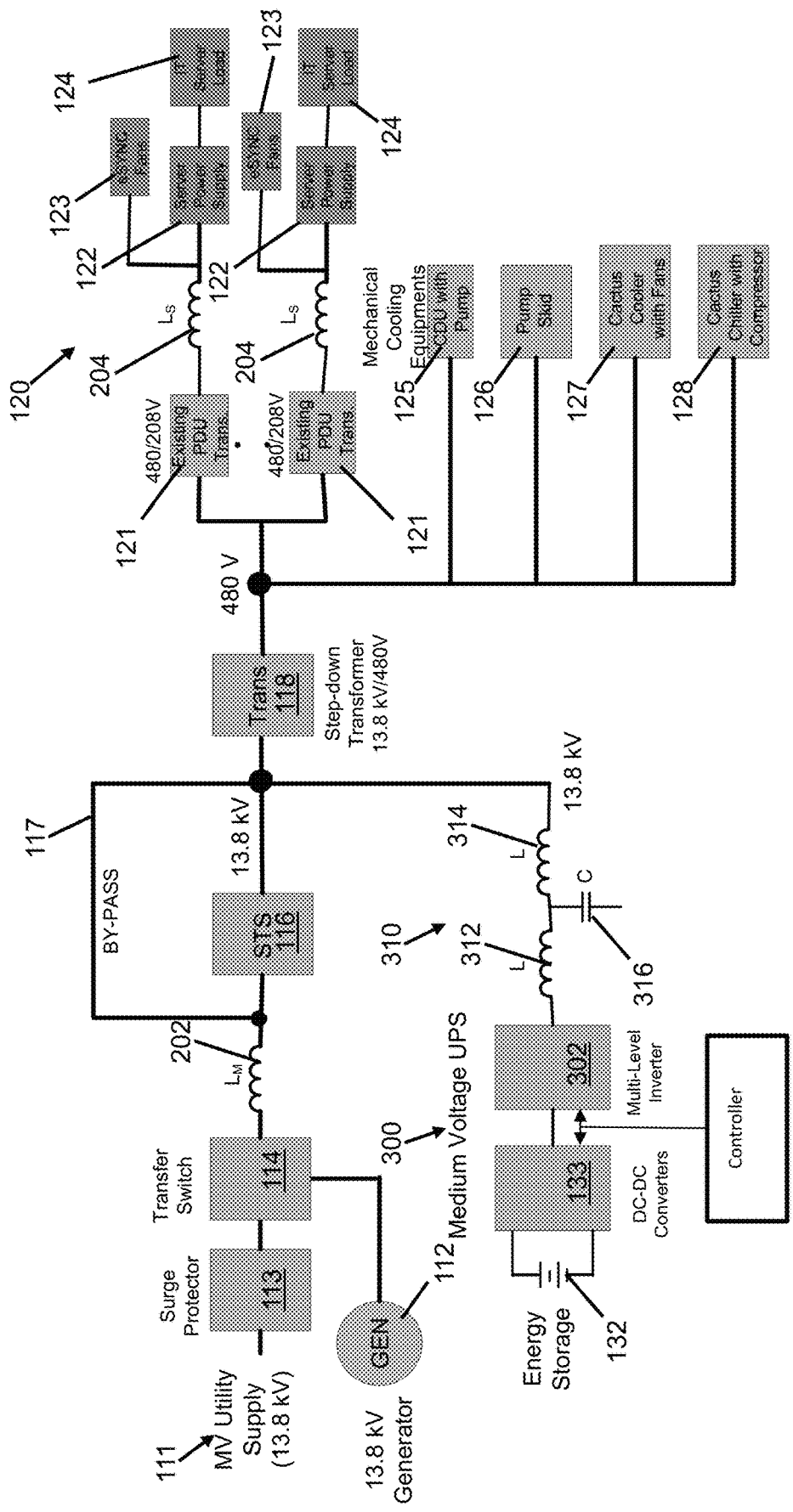
FIG. 3 is a schematic block diagram of an existing MV DC electrical system incorporating line reactors at the MV and LV distribution points and not incorporating any step-up transformers at the output of an MV uninterruptible power supply (UPS)

FIG. 3 shows a multi-level MVUPS electrical system without any step-up transformer and incorporating a line reactor $L_M$ 202 located at the MV distribution point. The line reactor $L_M$ 202 is coupled to AC MV line to reduce harmonics in the power supplied by the utility supply 111 or generator supply 112. SVPWM control of multi-level (ML) inverter 302 in the MVUPS 300 provides advantages of superior harmonic quality in comparison to sinusoidal PWM. The ML inverter 302 with LCL filter 310 at its output also provides additional harmonic reduction. The LCL filter 310 is used due to use of lower IGBT switching frequency (1 kHz) as it helps to attenuate, for example, 60 dB/decade, above the resonant frequency. The multi-level MVUPS 300 reduces harmonics due to use of SVPWM control and the LCL filter 310 at the output of the multi-level MVUPS 300 in comparison to the two-level MVUPS 130 with the step-up transformer 136. Also, good current ripple attenuation is achieved with small values of inductances in the LCL filter 310. The multi-level MVUPS electrical system also incorporates additional modular line reactors Ls 204 located at the LV distribution side after at the output of the existing PDU transformers 121. The combination of line reactor $L_M$ 202 and line reactors Ls 204 reduce extra harmonic current in comparison to FIG. 1 and provides passive filtering.

Figure 4:
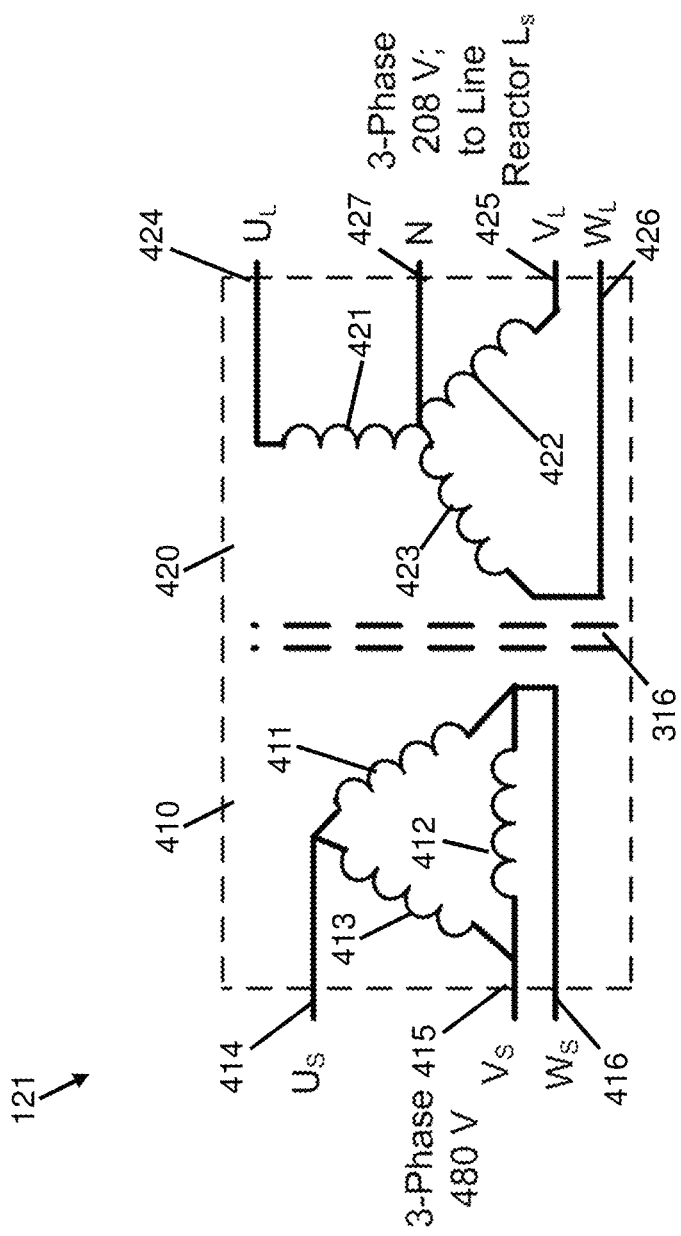
FIG. 4 is a circuit diagram of a conventional power distribution unit (PDU) transformer.

FIG. 4 illustrates a typical configuration of a 3-phase PDU transformer. The PDU transformer includes a primary side 410 having windings 411-413 in a delta configuration and a secondary side 420 having windings 421-423 in a wye configuration with a neutral connection 427. As shown, the primary side 410 and the secondary side 420 are electrically isolated from each other 316.

Figure 5:
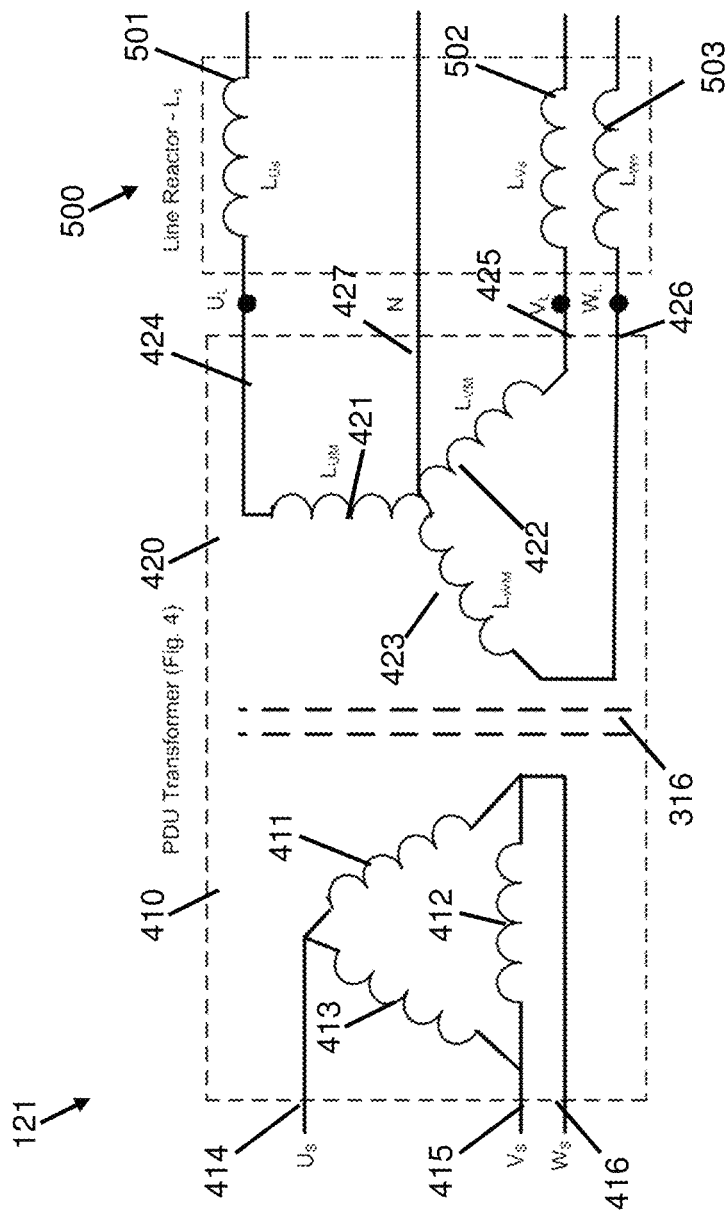
FIG. 5 is a circuit diagram of the power distribution unit of FIG. 4 coupled to an external line reactor.

FIG. 5 shows both a PDU transformer 500 and a separate line reactor $L_S$ module 500 having line reactors 501-503 to reduce current harmonics. This configuration is expensive and occupies extra IT space or volume as it contains two discrete magnetic circuits.

Figure 6:
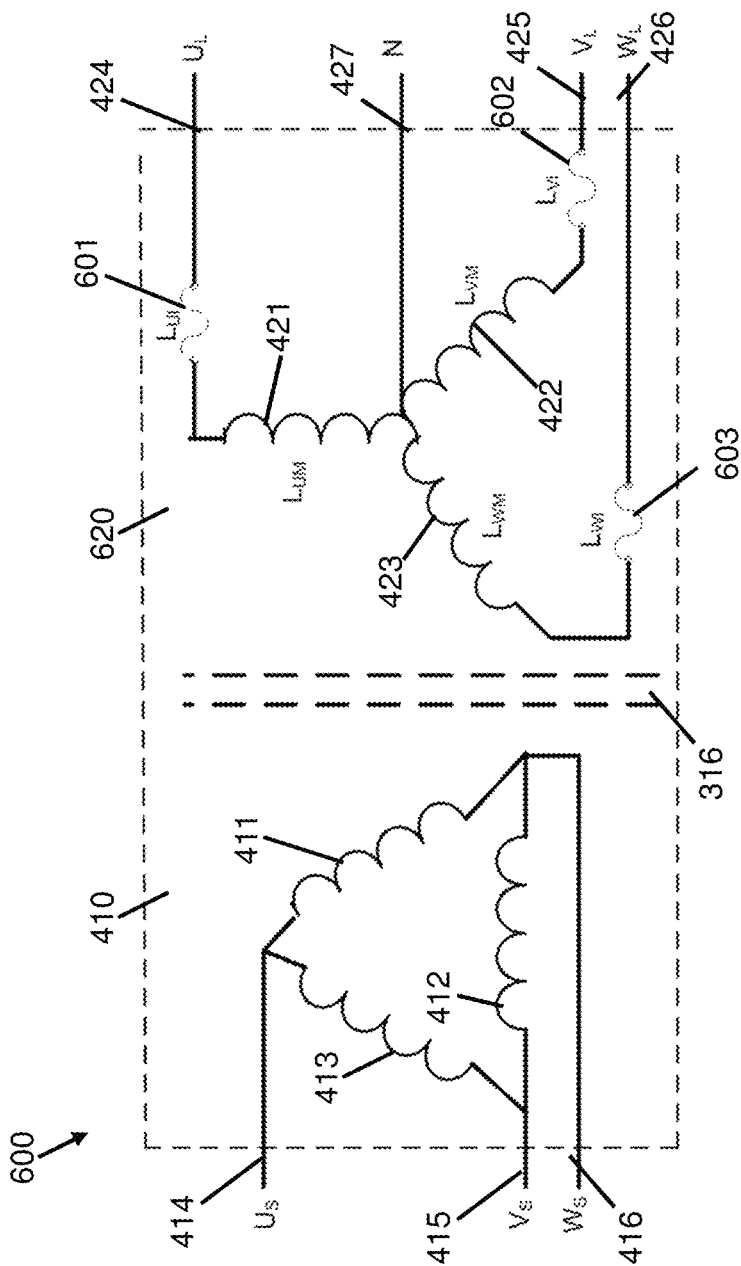
FIG. 6 is a circuit diagram of a power distribution unit according to embodiments of the present disclosure.

FIG. 6 shows a magnetically coupled PDU transformer 600 with added values of line impedance using leakage inductance coils 601-603 in one modular frame. The leakage inductance coils 601-603 are formed by additional windings coupled to the respective windings 421-423 and incorporated into the same package as the windings 421-423.

Figure 7:
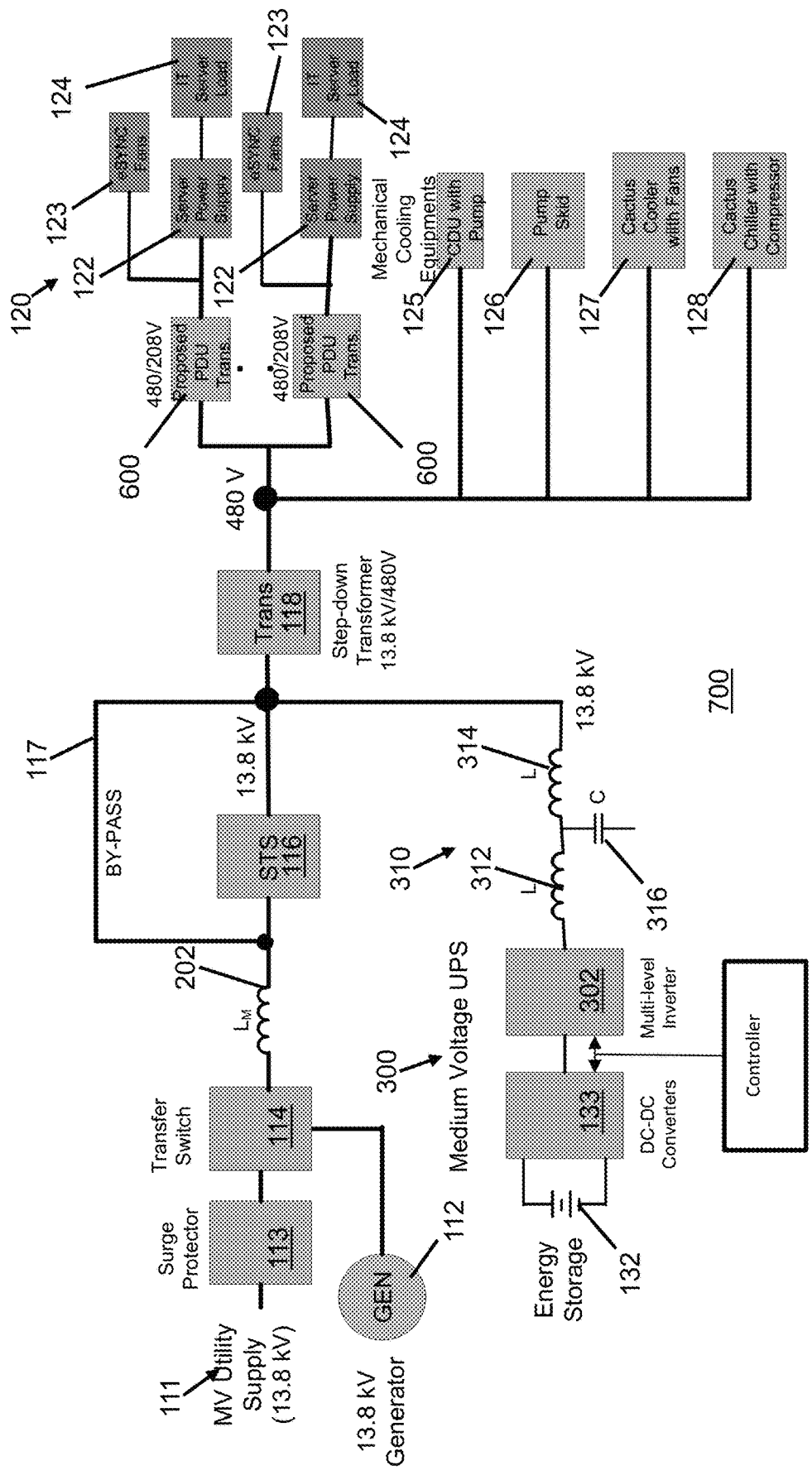
FIG. 7 is a schematic block diagram of an MV DC electrical system employing a passive filtering configuration according to some embodiments of the present disclosure.

FIG. 7 shows a multi-level MVUPS electrical system incorporating the PDU transformer 600 of FIG. 6 according to embodiments of the present disclosure. Appropriate values of line impedance may be obtained by adjusting allowable values of leakage inductances of the PDU transformers 600 to reduce line current harmonics. There are no separate line reactor components in addition to the respective PDU transformers 600. Hence, the electrical system 700 reduces both size and overall cost. As shown, the electrical system 700 uses a passive filtering configuration.

Figure 8:
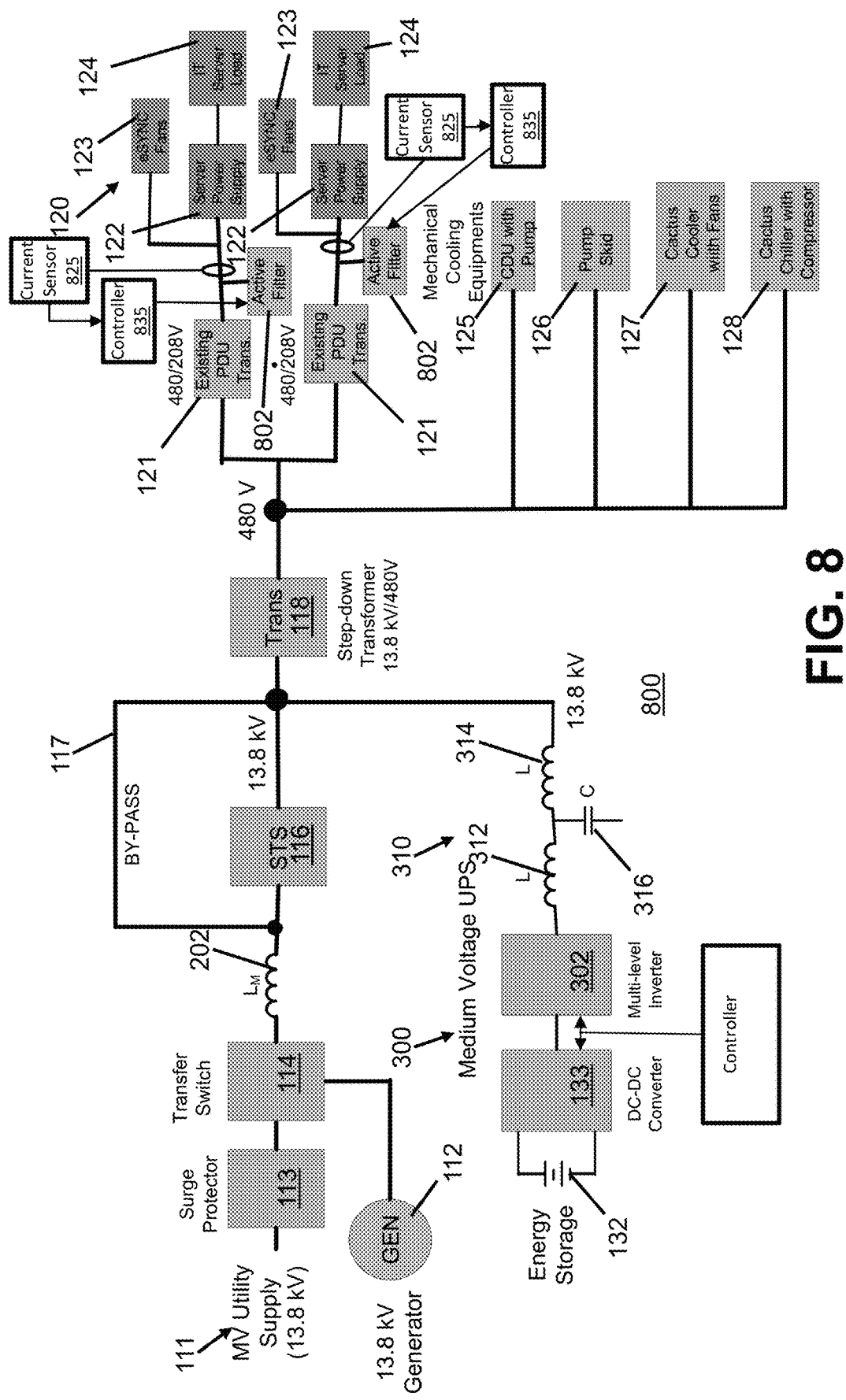
FIGS. 8-10 are schematic block diagrams of MV DC electrical systems employing hybrid active and passive filtering configurations according to other embodiments of the present disclosure.

FIG. 8 shows an electrical system 800 having a line reactor $L_M$ 202 located at the MV supply line. The electrical system 800 uses a transformerless medium voltage uninterruptible power supply (MVUPS) 300 including a multi-level inverter 302 and an LCL filter. The electrical system 800 also uses LV active filtering (AF) for the IT server assembly 120 coupled to the secondary coils of the PDU transformer. Thus, the electrical system 800 incorporates hybrid filtering including both MV passive and LV active filtering.

Figure 16:
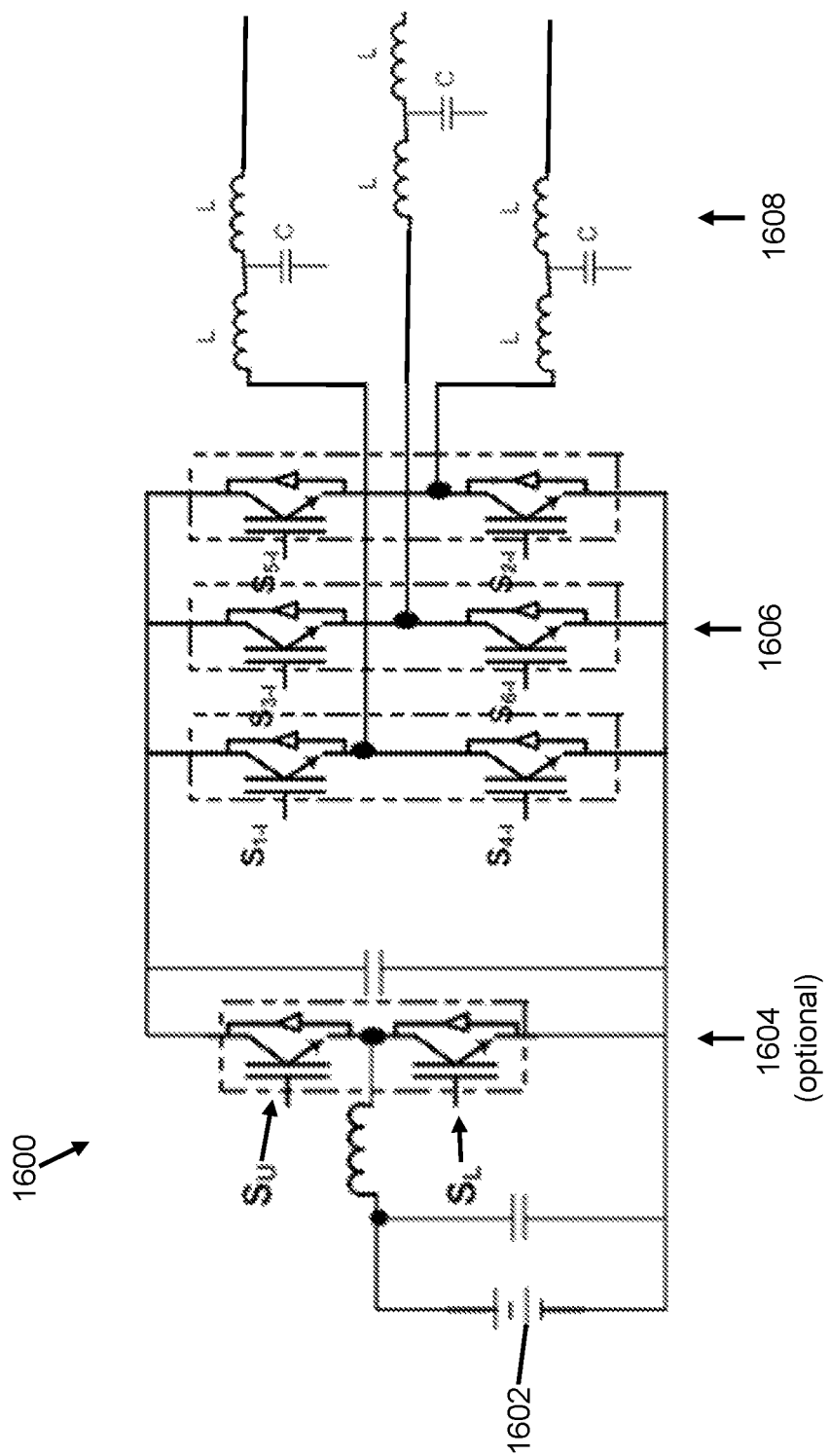
FIG. 16 is a circuit diagram of an active filter including a two-level inverter according to embodiments of the present disclosure.

The active filters 802 may include another energy storage device, e.g., the energy storage device 1602 of FIG. 16, such as an ultracapacitor, a battery, or a combination of the battery and the ultracapacitor, a two-level inverter, e.g., the two-level inverter 1606 of FIG. 16, and LCL filters, e.g., the LCL filters 1608 of FIG. 16, to provide harmonic current to compensate for the harmonic current drawn by the nonlinear electrical components of the IT server assembly 120 and the mechanical cooling equipment 125-128. In embodiments, the other energy storage device of the active filter 802 is coupled in parallel with the two-level inverter, and the two-level inverter is coupled in series with the LCL filters. The two-level inverter is controlled by a digital signal processor. The advantage of using an active filter is that it does not introduce a voltage drop like the passive line reactor does.

Figure 9:
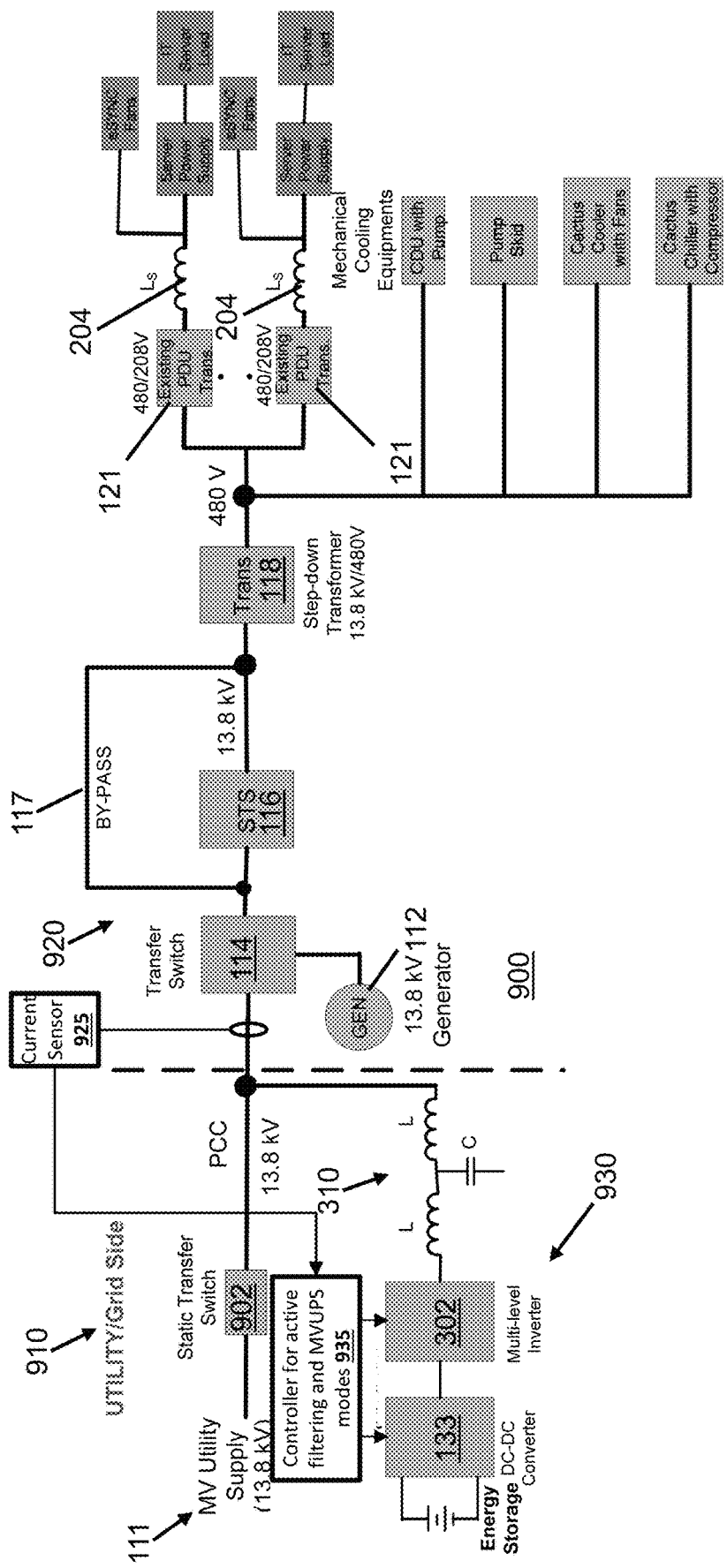

FIG. 9 shows an electrical system 900 incorporating a transformerless MV DCSTATCOM. The electrical system includes the DC-DC converter 133, the multi-level inverter 302, LCL filter 310, and a controller 935 coupled to the DC-DC converter 133 and the multi-level inverter 302 located at the medium voltage utility/grid side 910. The controller 935 generates space vector pulse width modulation (SVPWM) signals and operates the multi-level inverter 302 using the SVPWM signals. The controller 935 also operates the DC-DC converter 133 and the multi-level inverter 302 in Active Filtering and MVUPS operation modes. In embodiments, the MVUPS mode is enabled during an interruption in power. The electrical system also includes, at the load side 920, existing PDU transformers 121 and line reactors 204 coupled to the secondary side of the PDU transformers 121. Thus, the electrical system 900 incorporates hybrid filtering including MV active filtering and LV passive filtering.

The control circuits for active filtering analyze and determine the harmonic components of the current with respect to the fundamental component of the current (e.g., all or a portion of the harmonic components within the range of the second harmonic component to the thirty-fifth harmonic component) delivered to the load and inject opposite harmonic currents to mitigate the overall line harmonics current. To determine the harmonic components of the current, a current sensor 825 of the electrical systems of FIGS. 8 and 11 senses a current at a location between the active filters 802 and the IT server assemblies 120 and/or a current sensor 925 of the electrical systems of FIGS. 9-11 senses a current at a location between the PCC and the transfer switch 114, and the current is filtered by a high-pass filter to obtain the harmonic components of the current with respect to the fundamental component of the current. The active filtering can achieve minimum current harmonic distortion levels. The cost to implement active filtering is high because of the use of power electronics devices, e.g., the multi-level inverter 302, and the DSP devices, e.g., the controller 935, used to control the power electronics devices.

Thus, the electrical system may be designed to obtain a minimum or a reasonable amount of harmonic current reductions for any particular application so that the implementation costs are minimized or are at a reasonable level. For example, the cost of the AF to reduce the overall current harmonics to 15% is less than the cost of the AF to reduce the overall current harmonics to 5% as the AF to reduce the overall current harmonics to 15% needs to inject less harmonic current into the electrical system to cancel harmonic current at that level.

In the AF mode, simultaneous independent active (P) power compensation and reactive (Q) power compensation is achieved by controlling the phase angle δ between the voltage of the multi-level inverter 302 $V_{INV}$ and the voltage of the grid $V_{GRID}$, and the modulation index (m) to obtain variable $V_{INV}$, according to the following equations:

$$P = 3 * V_{GRID} * V_{INV} * \sin \delta / \omega * L \qquad (1)$$

$$Q = 3 * V_{GRID} * (V_{INV} * \cos \delta - V_{GRID}) / \omega * L \qquad (2)$$

where ω is the line frequency and L is the effective line reactance of the LCL filters. The active (P) power compensation portion supplies the harmonic current by operating the switching devices, e.g., IGBTs, of the multi-level inverter 302 to compensate for the harmonic component of the current from the nonlinear load. The reactive (Q) power compensation portion maintains the power factor at PCC. The phase angle δ is controlled to be a positive value to supply harmonic current in the case of AF mode and/or fundamental current in the case of MVUPS during an interruption in power from the MV utility supply 111. The phase angle determines harmonic current to compensate for the line harmonics introduced by the nonlinear load from the switching of the power supplies.

Figure 10:
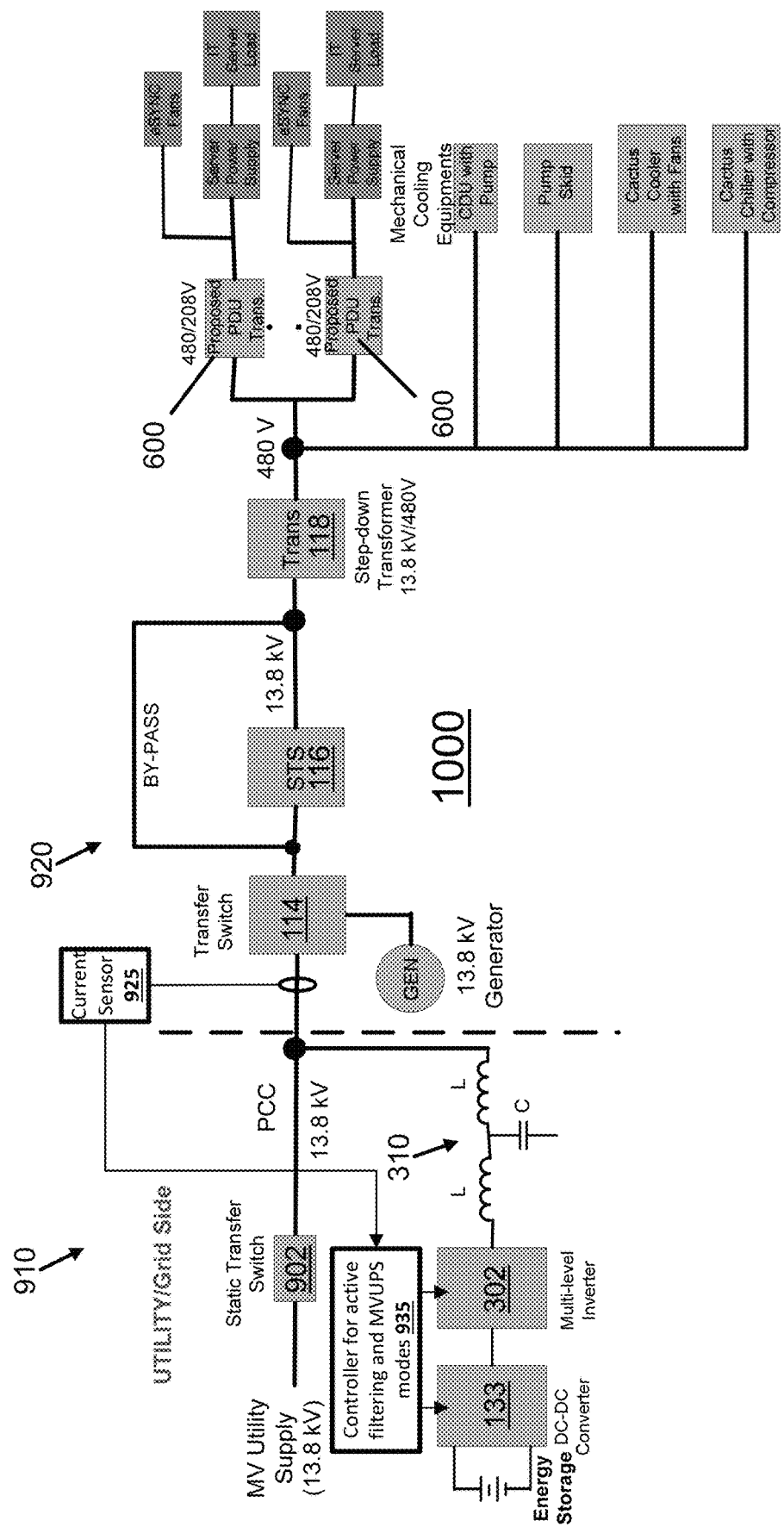

FIG. 10 shows another electrical system 1000 that is the same as the electrical system 900 of FIG. 9, except that each combination of the existing PDU transformer 121 and the line reactor 204 is replaced by the PDU transformer 600 of FIG. 6 on the load side 920. Thus, the electrical system 1000 incorporates hybrid filtering including MV active filtering and LV passive filtering.

Figure 11:
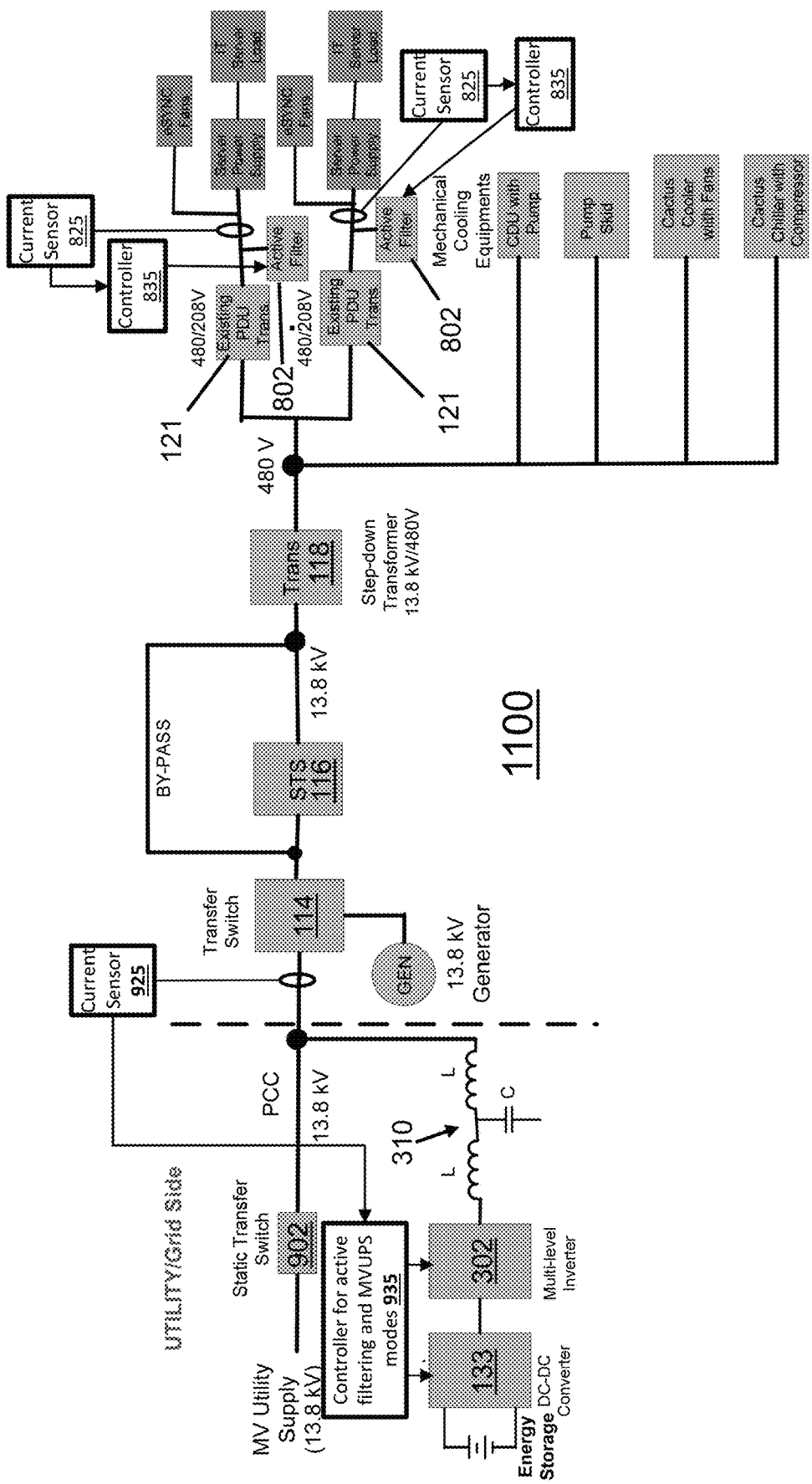
FIG. 11 is a schematic block diagram of an MV DC electrical system employing an active filtering configuration according to yet other embodiments of the present disclosure.

FIG. 11 shows still another electrical system 1100 that is the same as the electrical system 900 of FIG. 9, except that each line reactor 204 is replaced by the active filter 802 in parallel with the existing PDU transformer 121. Thus, the electrical system 1100 incorporates active filtering including both MV active filtering and LV active filtering.

Figure 12:
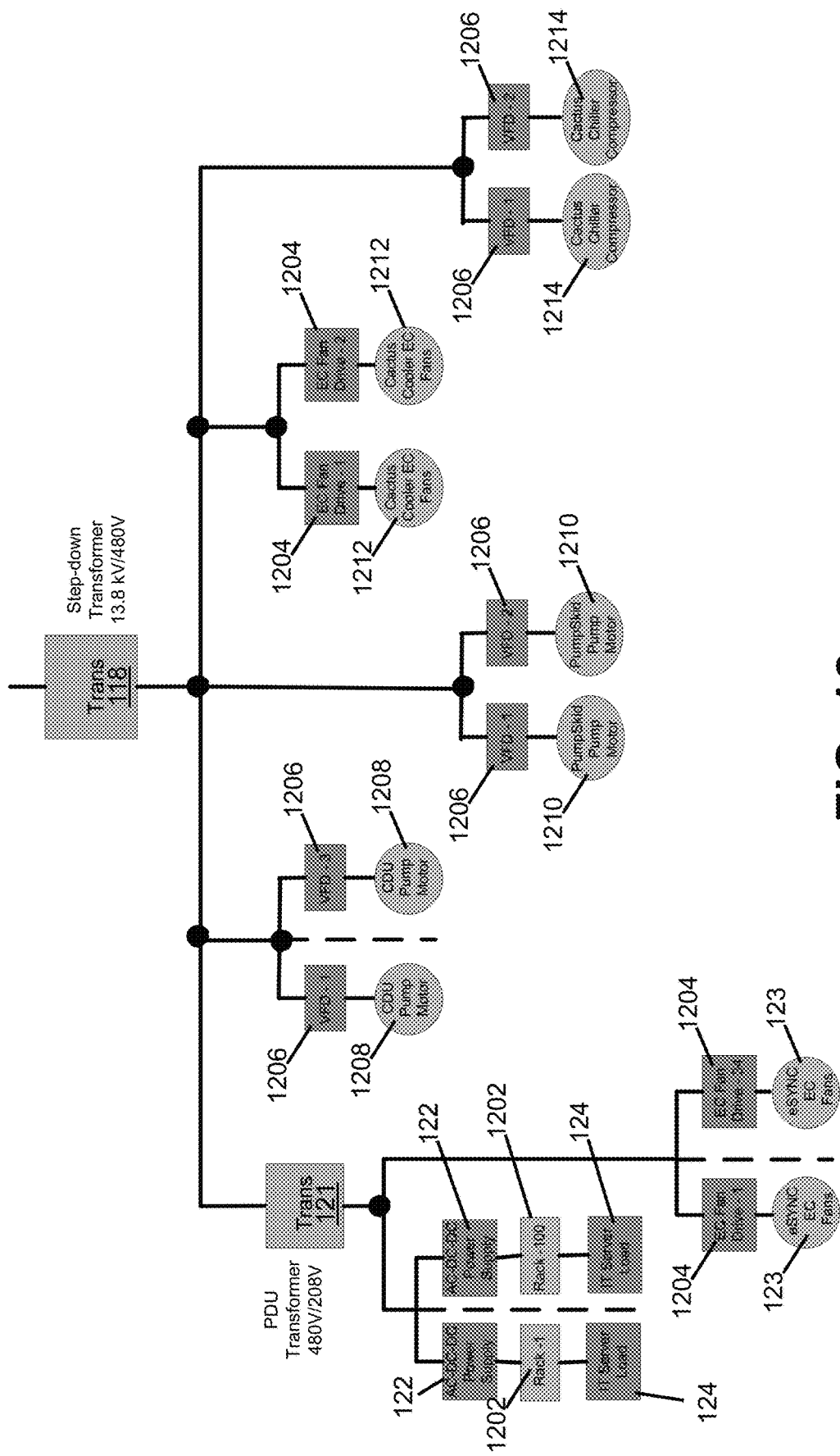
FIG. 12 is a schematic block diagram of an exemplary load for a data center according to embodiments of the present disclosure.

FIG. 12 shows the load side of the electrical systems of the present disclosure. The load side includes the server racks, the evaporative cooling devices, the CDUs, the pump skids, the fluid coolers, and the chillers. The server racks each include an AC-DC-DC power supply 122, rack 1202 to hold the power supply and the server, and the IT server load 124. The evaporative cooling devices each include a fan drive 1204 and a fan 123 electrically coupled to the fan drive 1204. The AC-DC-DC power supplies 122 and the fan drives 1204 are electrically coupled to the step-down transformer 118 via the PDU transformer 121.

The CDUs each include a variable frequency drive 1206 and a pump motor 1208 electrically coupled to the variable frequency drive 1206. The pump skid includes variable frequency drives 1206 and pump motors 1210 electrically coupled to respective variable frequency drives 1206. The fluid coolers include fan drives 1204 and fans 1212 electrically coupled to respective fan drives 1204. The chillers include variable frequency drives 1206 and compressors 1210 electrically coupled to respective variable frequency drives 1206. The variable frequency drives 1206 of the CDUs, the pump skid, and the chillers, and the fan drives 1204 of the fluid coolers are electrically coupled to the step-down transformer 118.

is 30 kW. Therefore, 34 evaporator cooling devices are needed to provide 1 MW cooling capacity. The evaporator cooling devices need a 1-phase AC supply having 174 A (with respect to 3-phase) and 208 V. The average cooling capacity of each CDU is 335 kW. Therefore, 3 CDUs are needed to provide 1 MW cooling capacity. The CDUs need a 3-phase AC supply having 30 A and 480 V. The average cooling capacity of the pump skid is 1 MW. Therefore, one pump skid is needed to provide 1 MW cooling capacity. The pump skid needs 3-phase AC supply having 30 A and 480 V.

The average cooling capacity of each fluid cooler is 500 kW. Therefore, 2 fluid coolers are needed to provide 1 MW

TABLE 1

1 MW Data Center Module

| Equipment | Quantity | Harmonic Sources | kW | Amps (3-Phase) | Individual Capacity | Comments |
|---|---|---|---|---|---|---|
| IT server racks: 208 V, 3-phase (120 V, 1-phase) | 100 | AC-DC-DC switching Power supplies for Server board, CPU, Memory, hard drives etc. | 1000 | 3084 | Server Rack: 10 kW (average) (100 × 10 = 1 MW IT electrical load) | 1000 kW; Power for IT server Load |
| Evaporative cooling devices: 208 V LL, 1-phase | 34 | Non-linear EC Fan Drive for EC fans, Switching Power supplies for Control etc. | 57 | 174 | Heat absorption: 30 kW (each includes 4 EC Fans totaling 136 fans) (34 × 30 = 1 MW cooling capacity) | 378 kW; Power for IT server cooling equipment (worst ambient condition) |
| CDUs: 480 V, 3-phase | 3 | Non-linear VFD Drive for Pump Motor, Switching Power supplies for Control etc. | 22 | 30 | Heat absorption: 335 kW each (each includes one Pump) (3 × 335 = 1 MW cooling capacity) | |
| Pump skid: 480 V, 3-phase | 1 | Each Pump house has two Pump motors; Non-linear VFD Drive for Pump Motor, Switching Power supplies for Control etc. | 22 | 30 | Heat absorption: 1 MW capacity | |
| Fluid coolers: 480 V, 3-phase | 2 | Non-linear EC Fan Drive for EC fans, Switching Power supplies for Control etc. | 37 | 50 | Heat absorption: 500 kW (each includes 8 EC Fans totaling 16 fans) (2 × 500 = 1 MW cooling capacity) | |
| Chiller module: 480 V, 3-phase | 2 | Non-linear VFD Drive for Compressor Motor, Switching Power supplies for Control etc. | 239 | 320 | Heat absorption: 500 kW (each includes one Compressor) (2 × 500 = 1 MW cooling capacity) | |

Table 1 shows exemplary specifications of a 1 MW data center module that includes 100 IT server rack modules (with the assumption that average IT capacity of each rack is 10 kW). For a 1 MW IT server load, the IT servers need a 3-phase AC supply having 3084 fundamental amperes and 208 volts. The remaining equipment, e.g., the evaporator cooling device, the CDUs, the pump skid, the fluid cooler, and the chiller are used to cool the IT server racks. The average cooling capacity of each evaporator cooling device cooling capacity. The fluid coolers need a 3-phase AC supply having 50 A and 480 V. The average cooling capacity of each chiller module is 500 kW. Therefore, 2 chiller modules are needed to provide 1 MW cooling capacity. The chiller modules need 3-phase AC supply having 320 A at 480 V. Therefore, 378 kW of additional power is needed for all the mechanical cooling equipment to cool 1 MW IT load at extreme ambient conditions.

TABLE 2

Individual and Total Current Harmonics

| Data Center Loads | Amps (3-Phase) | Amps (3-Phase) at 480 V | Existing (FIG. 1) harmonics Amps | Individual THD-I % | Passive Filter (FIGS. 2, 3, 6) harmonics Amps | Individual THD-I % | Hybrid Filter:1 (FIG. 8) harmonics Amps | Individual THD-I % | Hybrid Filter: 2 (FIGS. 9, 10) Harmonics Amps | Individual THD-I % | Active Filter (FIG. 11) Harmonics Amps | Individual THD-I % |
|---|---|---|---|---|---|---|---|---|---|---|---|---|
| IT racks | 3084 | 1336 | 468 | 35 | 164 | 12 | 70 | 5 | 70 | 5 | 40 | 3 |
| Evaporator cooling devices | 174 | 76 | 26 | 35 | 9 | 12 | 4 | 5 | 4 | 5 | 2 | 3 |
| CDUs | 30 | 30 | 11 | 35 | 4 | 12 | 4 | 12 | 2 | 5 | 2 | 7 |

TABLE 2-continued

Individual and Total Current Harmonics

| Data Center Loads | Amps (3-Phase) | Amps (3-Phase) at 480 V | Existing (FIG. 1) harmonics Amps | Individual THD-I % | Passive Filter (FIGS. 2, 3, 6) harmonics Amps | Individual THD-I % | Hybrid Filter:1 (FIG. 8) harmonics Amps | Individual THD-I % | Hybrid Filter: 2 (FIGS. 9, 10) Harmonics Amps | Individual THD-I % | Active Filter (FIG. 11) Harmonics Amps | Individual THD-I % |
|---|---|---|---|---|---|---|---|---|---|---|---|---|
| Pump Skid | 30 | 30 | 10 | 35 | 4 | 12 | 4 | 12 | 2 | 5 | 2 | 7 |
| Fluid Cooler | 50 | 50 | 18 | 35 | 18 | 35 | 18 | 35 | 8 | 15 | 10 | 20 |
| Chiller | 320 | 320 | 112 | 35 | 39 | 12 | 39 | 12 | 17 | 5 | 22 | 7 |
| Total Fundamental Amps | | 1842 | | | | | | | | | | |
| Total Harmonics (Amps) | | | 645 | | 237 | | 138 | | 102 | | 79 | |
| % THD-I at Grid | | | | 35 | | 13 | | 8 | | 6 | | 4 |
| Comments | | | L at MV Grid | | $L_M$, effective $L_S$ and additional line reactors for other loads | | $L_M$, 15% AF at LV and additional line reactors for other loads | | 15% AF at MV, effective $L_S$ and additional line reactors for other loads | | 20% AF at MV, 15% AF at LV and additional line reactors for other loads | |

Table 2 shows that a total of 1842 amps of 3-phase fundamental current are needed for a 1 MW DC block at 480 V. The existing electrical system of FIG. 1 with a 5% line reactor L at MV generates a total of 645 amps of harmonic current. With a 5% impedance line reactor, the maximum achievable current distortion level is 35%. Therefore, the total harmonic distortion current (THD-I) at the grid is 35%. The THD-I for IT server racks is also 35%. According to the IEEE 519 standard, the maximum allowed THD-I limit is 8%.

The total harmonic distortion (THD) is the amount of distortion, i.e., the second and greater harmonics, in the current or voltage waveform with respect to the fundamental, i.e., the first harmonic, current or voltage waveform. The total harmonic current distortion (THD-I) is defined as:

$$\text{THD-I} = I_{Total\ Harmonic}/I_1 \quad (3)$$

where $I_{Total\ Harmonic}$ is the total harmonic current and I1 is the fundamental current, i.e., the first harmonic current.

To improve THD-I further, another 5% effective line reactance $L_S$ (either independent or coupled PDU) is added before the IT server and evaporative cooling device loads as shown in FIGS. 2, 3, and 6 at the LV side and additional 5% individual line reactors are added for CDU pump-motor VFDs, pump skid pump-motor VFDs, and chiller module compressor-motor VFDs. The electrical system also includes a 5% line reactor $L_M$ at the MV side in addition to the above added filters. This is part of passive filtering techniques. The combination of all the above filters generates 237 A of harmonic current. Therefore, the total harmonic distortion current (THD-I) at the grid is 13%, which is lower in comparison to the THD-I of FIG. 1. The THD-I for the IT server racks is 12%.

The hybrid filtering technique is implemented to further improve the THD-I. For example, in the hybrid filtering technique implemented in FIG. 8, both passive and active filtering are performed. In addition to the 5% compensation provided by the line reactor $L_M$ at MV, the hybrid filtering technique implemented in FIG. 8 also provides active filtering having a 15% compensation capacity for IT servers and evaporative cooling devices. There are also 5% individual line reactors for CDU pump-motor VFDs, pump skid pump-motor VFDs, and chiller module compressor motor VFDs. The combination of all the above compensation components generates 138 amps of harmonic current. Therefore, the total harmonic distortion current (THD-I) at the grid is 8%, which satisfies the IEEE 519 standard and is lower than the THD-I of the electrical systems of FIGS. 2, 3, and 6. The THD-I for the IT server racks is 5%.

In the hybrid filtering techniques implemented in the electrical systems of FIGS. 9 and 10, both the active and passive filtering are performed. In addition to the 15% compensation capacity provided by the MV active filtering technique, the hybrid filtering techniques implemented in the electrical systems of FIGS. 9 and 10 also provide 5% compensation from the line reactor $L_S$ at the LV side for the IT servers and evaporative cooling devices. There is also 5% compensation capacity provided by the individual line reactors for the harmonics introduced by the CDU pump motor VFDs, the pump skid pump motor VFDs, and the chiller module compressor motor VFDs. In sum, the hybrid filtering techniques implemented in the electrical systems of FIGS. 9 and 10, generates 102 amps of harmonic current. Therefore, the total harmonic distortion current (THD-I) at the grid is 6%, which is lower than the maximum limit specified by the IEEE 519 standard and is lower than the THD-I of FIG. 8. The THD-I for the IT server racks is 5%.

To achieve lower THD-I, active filtering techniques for both MV (20% capacity) and LV (15% capacity) may be employed. There are also 5% individual line reactors for CDU pump motor VFDs, pump skid pump motor VFDs, and chiller module compressor motor VFDs. As a result, there is only 79 amps of harmonic current. Therefore, the THD-I at the grid is only 4%. The THD-I for the IT server racks is only 3%.

TABLE 3

Current THD (THD-I) value and relative cost of various filtering configurations

| Filtering Technique | Grid side THD-I | IT and eSYNC THD-I | CDU THD-I | Pump Skid THD-I | Fluid Cooler THD-I | Chiller THD-I | Comments | Comments | Relative Cost |
|---|---|---|---|---|---|---|---|---|---|
| Existing Passive Filtering (FIG. 1) | 35% due to L for non-linear DC load | 35% due to L | 35% due to L | 35% due to L | 35% due to L | 35% due to L | Regular PDU Transformer | Line filter L: 5% line impedance | 15% |
| Passive Filtering (FIGS. 2, 3, and 6) | 13% due to $L_M$, effective $L_S$ and Line filters for non-linear DC load | 12% due to both $L_M$ and $L_S$ | 12% due to both $L_M$ and 5% VFD line Filter | 12% due to both $L_M$ and 5% VFD line Filter | 35% due to $L_M$ | 12% due to both $L_M$ and 5% VFD line Filter | Either due to external $L_S$ or coupled PDU Transformer | Line filters $L_M$ and $L_S$: 5% line impedance | 30% |
| Hybrid Filtering 1 (FIG. 8) | 8% due to $L_M$, LV AF and Line filters for non-linear DC load | 5% due to both $L_M$ and LV AF (15% capacity) | 12% due to both $L_M$ and 5% VFD line Filter | 12% due to both $L_M$ and 5% VFD line Filter | 35% due to $L_M$ | 12% due to both $L_M$ and 5% VFD line Filter | Regular PDU Transformer | Line filter $L_M$: 5% line impedance; 15% THD-I reduction by LV AF (to optimize AF cost) | 55% |
| Hybrid Filtering 2 (FIGS. 9 and 10) | 6% due to DCSTATCOM MV AF, effective $L_S$ and Line filters for non-linear DC load | 5% due to both MV AF and $L_S$ | 5% due to both MV AF and 5% VFD line Filter | 5% due to both MV AF and 5% VFD line Filter | 15% due to MV AF | 5% due to both MV AF and 5% VFD line Filter | Either due to external $L_S$ or coupled PDU Transformer | 15% THD-I reduction by MV AF (to optimize AF cost); Line filter $L_S$: 5% line impedance | 75% |
| Active Filtering (FIG. 11) | 4% due to DCSTATCOM MV AF and LV AF for non-linear DC load | 3% due to both MV AF and LV AF | 7% due to both MV AF and 5% VFD line Filter | 7% due to both MV AF and 5% VFD line Filter | 20% due to MV AF | 7% due to both MV AF and 5% VFD line Filter | No $L_M$ or $L_S$ are needed; Regular PDU Transformer | 20% THD-I reduction by MV AF (to optimize MV AF cost further) and 15% LV AF | 100% |

Table 3 illustrates the THD-I values for various filtering configurations and the relative cost to implement those filtering configurations to mitigate harmonic line current.

The existing passive filtering of FIG. 1 is low cost because a single line inductor L is used. The overall THD-I is 35% at the grid. This is higher than the allowed 8% current harmonics specified by the IEEE 519 standard. As a result, the efficiency of the electrical system is low because of the presence of extra higher harmonic current, e.g., 645 amps, in the electrical system. Also, there is a 5% line voltage drop across the line inductor L. The cost of the existing passive filtering employed in the electrical system of FIG. 1 is 15% with respect to the cost of the MV and LV active filtering technique employed in FIG. 11.

The passive filtering techniques employed in the electrical systems of FIGS. 2, 3 and 6 are more expensive than the passive filter technique employed in FIG. 1 because of the use of two line inductors $L_M$ and $L_S$ in the electrical systems of FIGS. 2 and 3 and the use of the line inductor $L_M$ and coupled to the PDU of FIG. 6. The overall THD-I is 13% at the grid. This is higher than the 8% current harmonics allowed by the IEEE 519 standard. The passive filtering technique employed in the electrical systems of FIGS. 2, 3, and 6 also increases efficiency of the electrical system because of the lower current harmonics, e.g., 237 amps, in the electrical system, which is lower than the current harmonics of FIG. 1. The electrical system of FIG. 6 with the coupled PDU is more compact in terms of volume than FIGS. 2 and 3 (with independent discrete magnetic circuits) and saves IT floor space, which is at premium value. The total 10% line voltage drop occurs across both of the line inductors. The cost of the passive filtering technique employed in the electrical systems of FIGS. 2, 3, and 6 is 30% of the cost of the active filtering technique employed in FIG. 11.

The first hybrid filtering technique employed in the electrical system of FIG. 8 is more expensive than the passive filtering techniques employed in the electrical systems of FIGS. 2, 3, and 6 because of the use of MV passive filtering using the line reactor $L_M$ and LV active filtering. The overall THD-I is 8% at grid and thus satisfies the IEEE 519 standard. The efficiency of the electrical system employing the first hybrid filtering technique is higher because of the lower harmonics current, e.g., 138 amps). There is no voltage drop across the LV active filters 802. There is a 5% line voltage drop across line reactor $L_M$ 202. The cost of the first hybrid filtering configuration employed in the electrical system 800 of FIG. 8 may be 55% of the cost of the MV and LV active filtering configuration employed in the electrical system of FIG. 11.

The electrical systems employing the second hybrid filtering configuration of FIGS. 9 and 10 are more expensive than the electrical system employing the second hybrid filtering techniques of FIG. 8 because of the use of both MV active filtering and LV passive filtering. The overall THD-I is 6% at the grid, which is lower than the IEEE 519 standard. The efficiency of the electrical systems of FIGS. 9 and 10 are better because of the lower harmonic current, e.g., 102 amps. There is no voltage drop across the MV active filter. There is a 5% line voltage drop across the line reactors $L_S$. The cost of the second hybrid filing configuration employed in the electrical systems of FIGS. 9 and 10 may be 75% of the cost of the MV and LV active filtering configuration of FIG. 11.

The relative cost of using the MV and LV active filtering configuration to mitigate harmonics as illustrated by FIG. 11 is the greatest in comparison to the passive and hybrid filtering configurations. The overall THD-I at the grid is 4% and the efficiency of the electrical system of FIG. 11 is the best compared to the efficiency of the hybrid and fully passive configurations because the current harmonics are at minimum, e.g., 79 amps in the exemplary specifications of Table 2. The MV and LV active filtering configuration also increases the equipment life cycle, reduces occasional malfunctions of the DSP controllers, reduces safety hazards associated with higher current, and possibly reduces or eliminates the potential penalties imposed by the utility. Also, there is no line voltage drop across the active filters.

Therefore, the first and second hybrid configurations fulfill the harmonic requirement of the IEEE 519 standard, i.e., 8% limit at the grid, with lower cost in comparison to the full active filtering configuration. In some applications, however, the cost may not be a factor, but the overall performance and efficiency of the electrical system may be a factor. Thus, the selection of the filtering technique for a particular application depends upon a number of factors including the cost, the harmonic requirements, and the efficiency requirements.

Figure 13:
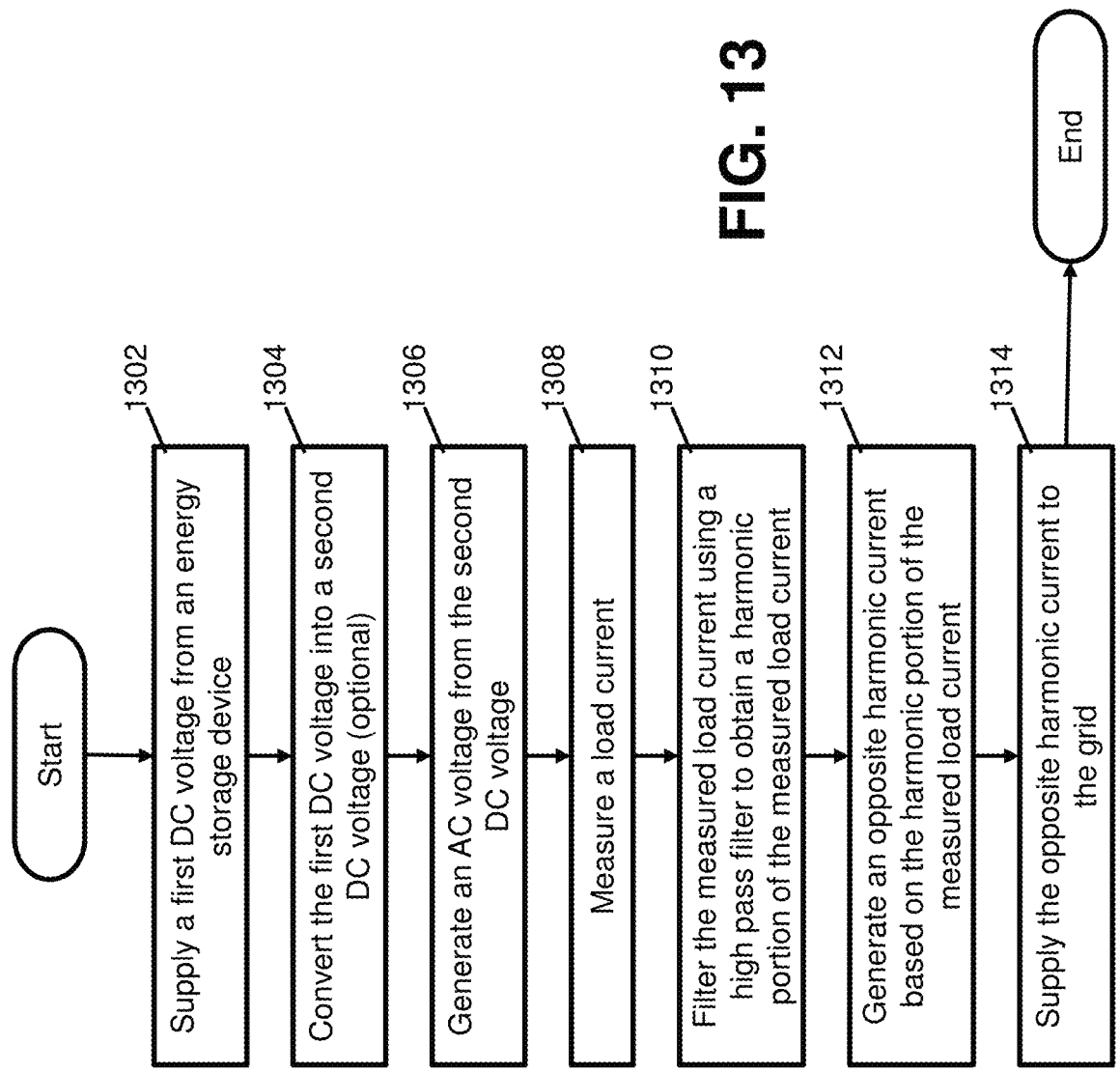
FIG. 13 is a flow diagram of an exemplary method of performing active filtering to generate a harmonic signal to mitigate harmonic current in the electrical system.

FIG. 13 is a flow diagram of an example process performed by the controller 935 and the controller of FIG. 8 to compensate for the grid harmonic current. After starting, a first DC voltage is supplied from an energy storage device, e.g., energy storage device 132 or energy storage device 1602, in step 1302. In step 1304, the first DC voltage is converted into a second DC voltage. Step 1304 may not be performed in the active filters 802 that do not include a DC-DC converter 1604 because the voltage of the energy storage device 1602 is high enough to not require the DC-DC converter 1604, which acts as a boost converter. In step 1306, an AC voltage is generated from the second DC voltage or, in the case where the DC-DC converter 1604 is not included in the active filter 802, the AC voltage is generated from the first DC voltage.

In step 1308, a load current is measured, for example, by the current sensor 825 and/or the current sensor 925. In step 1310, the measured load current is filtered using a high pass filter to obtain a harmonic portion of the measured load current, e.g., the controller 835 and/or the controller 935 filters the measured load current. In step 1312, an opposite harmonic current is generated based on the harmonic portion of the measured load current. The opposite harmonic current is an AC current that is 180 degrees out of phase from the harmonic portion of the measured load current. Then, in step 1314, before the process of FIG. 13 ends, the opposite harmonic current is supplied to the grid. In the case of the MVUPS 300, the opposite harmonic current is supplied to the grid at the point of common coupling (PCC).

Figure 14:
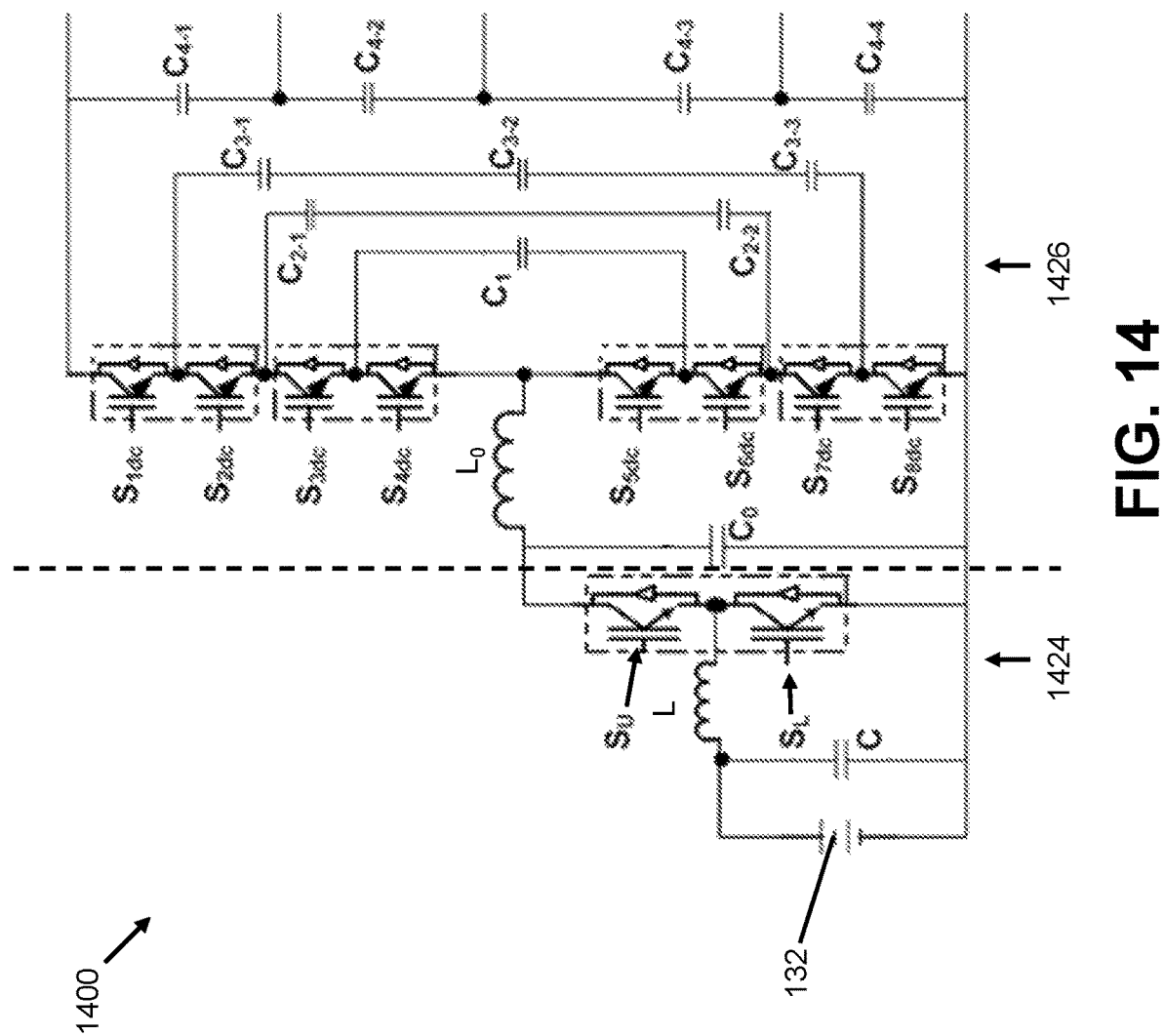
FIG. 14 is a circuit diagram of a DC-DC converter according to embodiments of the present disclosure.

FIG. 14 depicts a DC-DC converter 1400, which may be employed as the DC-DC converter 133 of FIGS. 7-11 and which may be employed in the active filter 802 of FIGS. 8 and 11. The DC-DC converter 1400 is a bi-directional two-stage DC-DC converter having a first stage 1424 and a second stage 1426. The first DC-DC stage 1424 converts the voltage from the energy storage device 132 into voltage V1. Voltage V1 is a DC voltage higher than the voltage of the energy storage device 132. The second DC-DC stage 1426 converts the voltage V1 into voltage V2, which is higher than voltage V1. The voltage boost from the first and second stages 1424, 1426 can range from about 1:5 to about 1:10. The voltage boost of the DC-DC converter 1400 can be adjusted by changing the size of the switches at each level, the number of stages, and/or the number of levels in each stage. The optimum boost voltage requirement is based on the given voltage of the energy storage device 132 and the required voltage output from the inverter 302. For lower voltage outputs from the inverter 302 the boost voltage ratio can be lower. For higher voltage outputs from the inverter 302 the boost voltage ratio can be higher. The efficiency of the DC-DC converter 1400 is reduced when the boost ratio is greater than about 7.

In FIG. 14, output capacitor $C_0$ and inductor $L_0$ connect the first stage 1424 to the second stage 1426. The first stage 1424 of the DC-DC converter 1400 is shown as a bidirectional, two-level DC-DC converter having one insulated gate bipolar transistor (IGBT) switch $S_U$ connected in series with another IGBT switch $S_L$. The switches $S_U$ and $S_L$ are connected to the energy storage device 132 of FIGS. 7-11, for example, through an LC filter, which includes capacitor C and inductor L.

If the switch $S_U$ is formed into a boost converter, the first stage 1424 may provide a range of duty or boost ratios. For example, as shown in Table 4 below, the boost ratio may range from 0 to 0.9. Thus, if the input voltage (VS) to the first stage 1424 is about 1 kV, the output voltage (V1) ranges from 1 kV to 10 kV depending on the value of the boost ratio, as shown in Table 4. The voltage V1 varies depending upon the inductance of L multiplied by the rate of change of current di/dt. As used herein, voltage V1 refers to the voltage output of the first stage 1424 of the DC-DC converter 1400. Also, as used herein, voltage V2 refers to the output voltage of the second stage 1426 of the DC-DC converter 1400.

TABLE 4

| VS (~1 kV) | Duty (Boost) ratio | V1 |
| --- | --- | --- |
| 1 kV | 0 | 1 kV |
| 1 kV | 0.2 | 1.25 kV |
| 1 kV | 0.4 | 1.66 kV |
| 1 kV | 0.6 | 2.5 kV |
| 1 kV | 0.7 | 3.3 kV |
| 1 kV | 0.8 | 5 kV |
| 1 kV | 0.9 | 10 kV |

The IGBT in switch $S_U$ may be configured in such a way as to handle a lower voltage and a higher current. Furthermore, because the IGBT of switch $S_U$ is handling a lower voltage, the overall size of the IGBT may be smaller.

The two-stage bidirectional DC-DC converter 1400 is a bi-directional converter. Switches $S_U$ and $S_{1dc}$-$S_{4dc}$ are used to discharge the energy storage 132) and switches $S_L$ and S5-S8 are used to charge the energy storage device 132. In particular, switch $S_U$ is configured as a boost converter that converts the voltage Vs of the energy storage device 132 to a higher voltage and switch $S_L$ is configured as a buck converter that converts voltage from the utility supply 111 to a lower voltage appropriate for charging the energy storage device 132, e.g., a voltage slightly more than Vs.

Each of the switches $S_{1dc}$-$S_{8dc}$ outputs a voltage equal to the input voltage V1. Since the switches $S_{1dc}$-$S_{8dc}$ are connected in series, the output voltage V2 is equal to the sum of the voltages output from each of the switches $S_{1dc}$-$S_{8dc}$. Thus, the boost ratio is 4:1 and V2 equals 4×V1.

The capacitors $C_1$-$C_{4-4}$ are relatively small capacitors, e.g., capacitors rated for about 5 kV with a capacitance value that is about ten times less than a capacitor for a conventional DC-DC converter. For example, if a conventional two-level DC-DC converter needs a capacitor having a value of about 2000 µF, then the multi-level flying capacitor arrangement (e.g., $C_1$-$C_{4-4}$) needs a capacitor having a value of about 200 µF. In a five-level arrangement, each switch $S_{1dc}$-$S_{4dc}$ operates at a fixed duty cycle of 25% and a fixed switching frequency without pulse width modulation. The voltages across the capacitors $C_1$-$C_{4-4}$ may be balanced in every switching cycle due to fixed duty cycle operation.

Additionally, the voltage across each switch $S_{1dc}$-$S_{4dc}$ maintains 25% of the high voltage V2.

As shown in FIG. 14, the number of capacitors coupled in series between the collectors of switches arranged in the upper portion of a stage and the emitters of the switches arranged in the lower portion of the stage depends on the level of the switch to which the capacitors are coupled. The DC-DC converter 1400, however, may include any number of capacitors coupled in series between the collectors and emitters of appropriate switches to achieve a desired result. The DC-DC converter 1400 of FIG. 14 is a five-level converter in a flying capacitor configuration.

Figure 15:
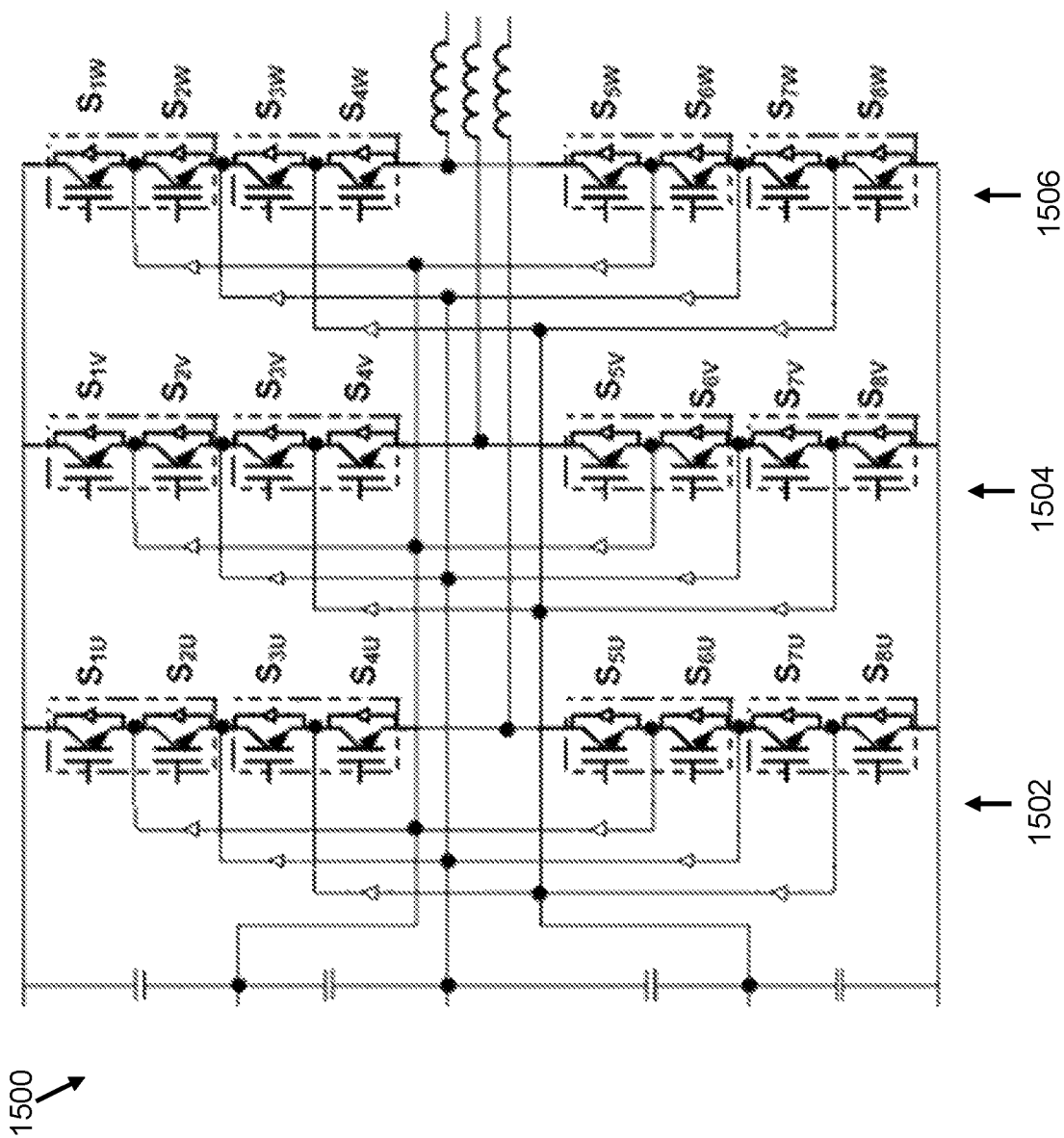
FIG. 15 is a circuit diagram of a five-level diode-clamped inverter according to embodiments of the present disclosure.

FIG. 15 shows a five-level diode-clamped inverter 1500, which may be employed as the multi-level inverter 302 of FIGS. 7-11 and which may be used to convert the DC voltage output V2 from the DC-DC converter 1400 to three-phase AC voltage V3. The five-level inverter 1500 includes three groupings of switches and diodes 1502, 1504, and 1506 to generate the three phases of the AC voltage V3, which is the output voltage of the inverter 1500. Each grouping of diodes and corresponding switches $S_{1U}$-$S_{8U}$, $S_{1V}$-$S_{8V}$, and $S_{1W}$-$S_{8W}$ are connected together in a diode-clamped configuration.

Switches $S_{1U}$-$S_{8U}$, $S_{1V}$-$S_{8V}$, and $S_{1W}$-$S_{8W}$ may be IGBTs. IGBTs allow for higher voltages/currents and higher switching frequencies. The five-level inverter 1500 illustrated in FIG. 15 allows for sharing of the high voltage among the switches $S_{1U}$-$S_{8U}$, $S_{1V}$-$S_{8V}$, and $S_{1W}$-$S_{8W}$, and reduces harmonic distortion.

The switches $S_{1U}$-$S_{8U}$, $S_{1V}$-$S_{8V}$, and $S_{1W}$-$S_{8W}$ are controlled by controller 935, which may include a digital signal processor (DSP). The DSP may use a space vector pulse width modulation (SVPWM) technique for operating the switches $S_{1U}$-$S_{8U}$, $S_{1V}$-$S_{8V}$, and $S_{1W}$-$S_{8W}$ in such a way that the neutral-point voltage remains balanced in open-loop operation. The SVPWM technique is an inverter modulation technique for synthesizing a voltage space vector V* over a modulation sampling period $T_S$. SVPWM control methods that can be used to control the multi-level inverters is described in PCT Patent Application No. PCT/US15/56785 (which published on Apr. 28, 2016, with Publication No. WO 2016/065087), the entire contents of which are incorporated herein by reference.

The SVPWM technique provides the advantages of superior harmonic quality and large under-modulation range that extends the modulation factor from 78.5% to 90.7%. Alternatively or in addition to the SVPWM, an artificial neural network (ANN) control technique can be used to reduce harmonics outputted from the inverter 1500.

FIG. 16 is an embodiment of an active filter 1600, which may be employed as the active filter 802 of FIGS. 8 and 11. The active filter 1600 includes an energy storage device 1602, a two-level inverter 1606, and LCL filters 1608 coupled to respective outputs of the two-level inverter 1606. In some embodiments, the active filter 1600 optionally includes a DC-DC converter 1604. The DC-DC converter 1604 may be needed in active filters 802 that include a very low voltage energy storage device 1602 so that the voltage can be boosted prior to the two-level inverter 1606. The energy storage device 1602 may be a battery, an ultracapacitor, or a combination of a battery and an ultracapacitor. The DC-DC converter 1604 is a two-level DC-DC converter having switch $S_U$ and switch $S_L$ connected together in series. The switches $S_U$ and $S_L$ may be insulated gate bipolar transistors (IGBTs). The switches $S_U$ and $S_L$ are connected to the energy storage device 132 through an LC filter.

The two-level inverter 1606 includes three pairs of series-connected switches, e.g., IGBTs, which are coupled together in parallel. The two-level inverter 1606 may be controlled according to space vector pulse width modulation (SVPWM) control to increase the linear operating range of the two-level inverter (e.g., from 78.5% to 90.7%) and to reduce the harmonic levels at the output of the two-level inverter 1606 as compared to sinusoidal PWM-based (SPWM) control. The switches of the DC-DC converter 1604 and the two-level inverter 1606 are controlled by a controller (not shown), which may include a digital logic circuit, such as a Field Programmable Gate Array (FPGA), and/or a processor, such as a digital signal processor (DSP) or a microprocessor. Techniques for controlling the two-level inverter 1606 are described in U.S. patent application Ser. No. 14/994,850 (filed on Jan. 13, 2016), the contents of which are incorporated herein by reference in their entirety.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. An electrical system, comprising:
   power distribution unit (PDU) transformers electrically coupled to respective power supplies, each PDU transformer including secondary coils in a wye configuration, wherein the secondary coils are in series with respective leakage inductance coils, wherein the secondary coils and the leakage inductance coils are integrated together into a single unit;
   an active filter electrically coupled to an output of each of the PDU transformers;
   an uninterruptible power supply (UPS) including:
      a bidirectional multi-level inverter electrically coupled to the PDU transformers;
      a bidirectional DC-DC converter electrically coupled in series with the bidirectional multi-level inverter; and
      a low voltage energy storage device electrically coupled in series with the bidirectional DC-DC converter; and
   a controller operably coupled to the bidirectional DC-DC converter and the bidirectional multi-level inverter of the UPS, the controller configured to operate the bidirectional DC-DC converter and the bidirectional multi-level inverter of the UPS in an active filtering mode to supply a harmonic current from the UPS to compensate for a harmonic portion of a load current and in a UPS mode to supply power from the UPS if an interruption in power is detected.

2. The electrical system of claim 1, further comprising a line reactor electrically coupled between an electrical grid and the PDU transformers.

3. The electrical system of claim 2, wherein the PDU transformers are electrically coupled to respective server power supplies and fan variable frequency drives,
   wherein the line reactor is further electrically coupled between the electrical grid and cooling system equipment, and
   wherein the bidirectional multi-level inverter and the DC-DC converter form at least a portion of the UPS, and wherein the UPS is further electrically coupled to the cooling system equipment.

4. The electrical system of claim 3, wherein the cooling system equipment is selected from the group consisting of fans for drawing hot air through evaporator coils, a cooling distribution unit (CDU) having a pump, a cooling system pump, a fluid cooler having fans, a chiller having a compressor, and combinations thereof.

5. The electrical system of claim 1, further comprising a current sensor configured to sense a load current,
wherein the controller filters the load current to obtain a harmonic portion of the load current and controls the bidirectional DC-DC converter and the bidirectional multi-level inverter of the UPS to generate the harmonic current based on the harmonic portion of the load current.

6. The electrical system of claim 1, wherein the PDU transformers are electrically coupled to respective plurality of server power supplies and fan variable frequency drives.

7. The electrical system of claim 1, further comprising an LCL filter coupled to an output of the bidirectional multi-level inverter of the UPS.

8. The electrical system of claim 1, wherein each PDU transformer further includes primary coils in a delta configuration.

9. The electrical system of claim 1, wherein the leakage inductance coils are formed by respective windings.

10. The electrical system of claim 1, further comprising a line reactor electrically coupled to an output of each of the PDU transformers.

11. The electrical system of claim 1, wherein the active filter includes an energy storage device and a two-level inverter.

12. The electrical system of claim 11, wherein the active filter further includes an LCL filter.

13. The electrical system of claim 11, wherein the energy storage device includes an ultracapacitor, a battery, or a combination of an ultracapacitor and a battery.

14. An electrical system, comprising:
power distribution unit (PDU) transformers electrically coupled to respective power supplies, each PDU transformer including secondary coils in a wye configuration;
an active filter electrically coupled to an output of each of the PDU transformers;
an uninterruptible power supply (UPS) including:
a bidirectional multi-level inverter electrically coupled to the PDU transformers;
a bidirectional DC-DC converter electrically coupled in series with the bidirectional multi-level inverter; and
a low voltage energy storage device electrically coupled in series with the bidirectional DC-DC converter; and
a controller operably coupled to the bidirectional DC-DC converter and the bidirectional multi-level inverter of the UPS, the controller configured to operate the bidirectional DC-DC converter and the bidirectional multi-level inverter of the UPS to supply a harmonic current from the UPS to compensate for a harmonic portion of a load current and to supply power from the UPS if an interruption in power is detected.

15. The electrical system of claim 14, wherein the active filter includes an energy storage device and a two-level inverter.

16. The electrical system of claim 15, wherein the active filter further includes an LCL filter.

17. The electrical system of claim 15, wherein the energy storage device includes an ultracapacitor, a battery, or a combination of an ultracapacitor and a battery.

18. The electrical system of claim 14, further comprising a line reactor electrically coupled between an electrical grid and the PDU transformers.

19. The electrical system of claim 18, wherein the PDU transformers are electrically coupled to respective server power supplies and fan variable frequency drives,
wherein the line reactor is further electrically coupled between the electrical grid and cooling system equipment, and
wherein the bidirectional multi-level inverter and the DC-DC converter form at least a portion of the UPS, and
wherein the UPS is further electrically coupled to the cooling system equipment.

20. The electrical system of claim 19, wherein the cooling system equipment is selected from the group consisting of fans for drawing hot air through evaporator coils, a cooling distribution unit (CDU) having a pump, a cooling system pump, a fluid cooler having fans, a chiller having a compressor, and combinations thereof.

* * * * *